United States Patent
Wang et al.

(10) Patent No.: US 12,176,487 B2
(45) Date of Patent: *Dec. 24, 2024

(54) ELECTROLYTE AND ELECTROCHEMICAL DEVICE

(71) Applicant: Ningde Amperex Technology Limited, Fujian (CN)

(72) Inventors: Kefei Wang, Ningde (CN); Qiao Zeng, Ningde (CN); Liangzhen Xiao, Ningde (CN); Fei Wu, Ningde (CN)

(73) Assignee: Ningde Amperex Technology Limited, Ningde (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/626,603

(22) Filed: Apr. 4, 2024

(65) Prior Publication Data

US 2024/0250300 A1    Jul. 25, 2024

Related U.S. Application Data

(63) Continuation of application No. 17/990,626, filed on Nov. 18, 2022, now Pat. No. 11,984,556, which is a (Continued)

(30) Foreign Application Priority Data

Sep. 21, 2018 (CN) .......................... 201811108529.X

(51) Int. Cl.
*H01M 10/0566* (2010.01)
*H01M 4/13* (2010.01)
(Continued)

(52) U.S. Cl.
CPC ......... *H01M 10/0566* (2013.01); *H01M 4/13* (2013.01); *H01M 4/64* (2013.01); (Continued)

(58) Field of Classification Search
CPC ......... H01M 10/0566; H01M 10/0525; H01M 10/04; H01M 10/0568
See application file for complete search history.

(56) References Cited

U.S. PATENT DOCUMENTS 6,544,685 B2    4/2003   Kim et al.
9,812,739 B2    11/2017  Kefei
(Continued)

FOREIGN PATENT DOCUMENTS

CN    101640290 A    2/2010
CN    102244294 A    11/2011
(Continued)

OTHER PUBLICATIONS

English Translation of: CN 106848381-A, Hong et al., Jun. 13, 2027.*
(Continued)

*Primary Examiner* — Kenneth J Douyette
(74) *Attorney, Agent, or Firm* — Maier & Maier, PLLC

(57) ABSTRACT

An electrolyte including a dinitrile compound, a trinitrile compound, and propyl propionate. Based on the total weight of the electrolyte, the weight percentage of the dinitrile compound is X, the weight percentage of the trinitrile compound is Y, and the weight percentage of the propyl propionate is Z, wherein about 2.2 wt %≤(X+Y)≤about 8 wt %, about 0.1≤(X/Y)≤about 6, 1 wt %<Y<5 wt %, about 30 wt %≤Z≤about 50 wt %, and about 0.02<(Y/Z)≤about 0.3.

30 Claims, 3 Drawing Sheets

Related U.S. Application Data continuation of application No. 17/064,782, filed on Oct. 7, 2020, now Pat. No. 11,522,222, which is a continuation of application No. 16/211,853, filed on Dec. 6, 2018, now Pat. No. 10,833,363.

(51) Int. Cl.
  H01M 4/64      (2006.01)
  H01M 4/70      (2006.01)
  H01M 10/0525   (2010.01)
  H01M 10/0567   (2010.01)
  H01M 10/0569   (2010.01)

(52) U.S. Cl.
  CPC ......... *H01M 4/70* (2013.01); *H01M 10/0525* (2013.01); *H01M 10/0567* (2013.01); *H01M 10/0569* (2013.01); *H01M 2300/0025* (2013.01); *H01M 2300/0034* (2013.01); *H01M 2300/0037* (2013.01)

(56) References Cited

U.S. PATENT DOCUMENTS

| | | | |
|---|---|---|---|
| 10,833,363 | B2 | 11/2020 | Wang et al. |
| 2007/0172736 | A1 | 7/2007 | Fujikawa et al. |
| 2009/0061325 | A1 | 3/2009 | Odani et al. |
| 2011/0311864 | A1 | 12/2011 | Yamada et al. |
| 2012/0313570 | A1 | 12/2012 | Ohtaniuchi et al. |
| 2014/0322596 | A1 | 10/2014 | Shatunov et al. |
| 2015/0140446 | A1 | 5/2015 | Li |
| 2016/0301103 | A1 | 10/2016 | Kim et al. |
| 2016/0301104 | A1 | 10/2016 | Shi et al. |
| 2017/0018803 | A1 | 1/2017 | Wang et al. |
| 2017/0069934 | A1 | 3/2017 | Kim et al. |
| 2017/0084956 | A1 | 3/2017 | Zhuang |
| 2017/0125845 | A1 | 5/2017 | Yu et al. |
| 2017/0288268 | A1 | 10/2017 | Kim et al. |
| 2017/0317385 | A1 | 11/2017 | Zhang et al. |
| 2017/0324116 | A1* | 11/2017 | Ohashi .............. C07D 207/452 |
| 2017/0346127 | A1 | 11/2017 | Zhang et al. |
| 2017/0346136 | A1 | 11/2017 | Wang |
| 2018/0108947 | A9 | 4/2018 | Zhuang |
| 2018/0233778 | A1 | 8/2018 | Park et al. |
| 2018/0301756 | A1 | 10/2018 | Sakaguchi |
| 2019/0214680 | A1 | 7/2019 | Bo et al. |
| 2019/0245245 | A1 | 8/2019 | Zhang et al. |

FOREIGN PATENT DOCUMENTS

| | | |
|---|---|---|
| CN | 102522590 A | 6/2012 |
| CN | 103348516 A | 10/2013 |
| CN | 103401020 A | 11/2013 |
| CN | 103441303 A | 12/2013 |
| CN | 103633371 A | 3/2014 |
| CN | 103779607 A | 5/2014 |
| CN | 103928708 A | 7/2014 |
| CN | 103956517 A | 7/2014 |
| CN | 104332653 A | 2/2015 |
| CN | 104752769 A | 7/2015 |
| CN | 104766995 A | 7/2015 |
| CN | 104979589 A | 10/2015 |
| CN | 105047992 A | 11/2015 |
| CN | 105074993 A | 11/2015 |
| CN | 105098237 A | 11/2015 |
| CN | 105186036 A | 12/2015 |
| CN | 105355968 A | 2/2016 |
| CN | 105355975 A | 2/2016 |
| CN | 105449262 A | 3/2016 |
| CN | 105529498 A | 4/2016 |
| CN | 105552439 A | 5/2016 |
| CN | 105609874 A | 5/2016 |
| CN | 105680088 A | 6/2016 |
| CN | 105845984 A | 8/2016 |
| CN | 105895957 A | 8/2016 |
| CN | 106099185 A | 11/2016 |
| CN | 106099187 A | 11/2016 |
| CN | 106356561 A | 1/2017 |
| CN | 104766995 B | 3/2017 |
| CN | 106602131 A | 4/2017 |
| CN | 106654128 A | 5/2017 |
| CN | 106784589 A | 5/2017 |
| CN | 106816633 A | 6/2017 |
| CN | 106848381 A | 6/2017 |
| CN | 107017432 A | 8/2017 |
| CN | 107210486 A | 9/2017 |
| CN | 107275553 A | 10/2017 |
| CN | 107394269 A | 11/2017 |
| CN | 107408734 A | 11/2017 |
| CN | 103682416 B | 2/2018 |
| CN | 108023117 A | 5/2018 |
| CN | 108134135 A | 6/2018 |
| CN | 108232300 A | 6/2018 |
| CN | 108242567 A | 7/2018 |
| CN | 108336297 A | 7/2018 |
| CN | 109301326 A | 2/2019 |
| CN | 109301326 B | 11/2020 |
| JP | 2008108454 A | 5/2008 |
| JP | 201722108 A | 1/2017 |
| KR | 101195931 B1 | 10/2012 |
| KR | 1020170051286 A | 5/2017 |
| KR | 1020180001989 A | 1/2018 |
| KR | 1020180016486 A | 2/2018 |

OTHER PUBLICATIONS

Xu et al., "Electrochemical equipment engineering design," China Mining University Press, Mar. 2018, 30 pages, English abstract only.

Zheng et al., "Electrolyte of Lithium ion battery," Chemical Industry Press, Jan. 2007, 23 pages, English abstract only.

Cheng, "Solvent Handbook, version forth," Chemical Industry Press, Nov. 2007, 5 pages, English abstract only.

Ma, "Dictionary of chemical substances," Shaanxi Science and Technology Press, Apr. 1999, 8 pages, English abstract only.

"Chemistry for Grade 9, vol. 2," People's Education Press, Nov. 2007, 7 pages, English abstract only.

Sigma-Aldrich, "Safety data sheet for 1,3-Propanesultone", 2023, 10 pages.

Sigma-Aldrich, "Safety data sheet for Succinonitrile", 2023, 9 pages.

Sigma-Aldrich, "Safety data sheet for Propanephosphonic acid anhydride (50% solution in 2-Methyltetrahydrofuran) for synthesis T3P®", 2023, 13 pages.

Sigma-Aldrich, "Safety data sheet for 4-Vinyl-1,3-dioxolan-2-one", 2023, 8 pages.

Seward et al., "The dielectric constants of ethylene carbonate and of solutions of ethylene carbonate in water, methanol, benzene and propylene carbonate," The Journal of Physical Chemistry, Jan. 1958, vol. 62, 3 pages.

ACS Division of Organic Chemistry, "Common Solvents Used in Organic Chemistry" Table of Properties, American Chemical Society, 2022, 2 pages.

Sigma-Aldrich, "Safety data sheet for Adiponitrile, >99%, acid < 200 ppm, H2O<100 ppm", 2023, 9 pages.

Sigma-Aldrich, "Safety data sheet for 1,3,2-Dioxathiolane 2,2-dioxide", 2023, 10 pages.

Sigma-Aldrich, "Safety data sheet for Ethylene carbonate", 2023, 9 pages.

Sigma-Aldrich, "Safety data sheet for Fluoroethylene carbonate", 2023, 9 pages.

Sigma-Aldrich, "Safety data sheet for 1,3,6-Hexanetricarbonitrile", 2023, 8 pages.

Sigma-Aldrich, "Safety data sheet for Lithium hexafluorophosphate", 2023, 10 pages.

Sigma-Aldrich, "Safety data sheet for Bis(trifluoromethane)sulfonimide lithium salt", 2023, 10 pages.

Sigma-Aldrich, "Safety data sheet for Propylene carbonate", 2023, 9 pages.

(56) References Cited

OTHER PUBLICATIONS

Sigma-Aldrich, "Safety data sheet for Propyl propionate", 2023, 10 pages.
Shanghai Weipu Testing Technology Group Co., Ltd., "Analysis Report, Report ID: SHA03-23062691-FX-01En, Sample Name: Electrolyte experiment," Sep. 2023, 13 pages.
Untergrenze des Propylpropionat-Gewichtsanteils in "Vergleichsbeispiel 6" und "Ausführungsform 25" der CN 106848381 A, 2023, 8 pages, partial English translation.
Shanghai Weipu Testing Technology Group Co., Ltd., "Analysis Report, Report ID: SSHA03-23062691-FX-03En, Sample Name: Electrolyte experiment," Sep. 2023, 13 pages.
Abe, "Nonaqueous Electrolytes and Advances in Additives," Electrolytes for lithium and lithium-ion batteries. Jow, T. Richard, et al., eds. 2014, vol. 58, 14 pages.
Zhuhai Cosmx Battery Co., Ltd., "Declaration of Dr. Menahem Anderman, Case No. IPR2023-00586, Patent No. 10,833,363," Feb. 2023, 175 pages.
Sigma-Aldrich, "Safety data sheet for Diethyl carbonate", 2023, 9 pages.
TCI, "Safety data sheet for Ethylene Glycol Bis(propionitrile) Ether", 2018, 5 pages.
Zhuhai Cosmx Battery Co., Ltd., "Declaration of Kelley M. Hayes Greenhill in Support of Petition for Inter Partes Review, Case No. IPR2023-00586, Patent No. 10,833,363," Feb. 2023, 15 pages.
Ningde Amperex Technology Limited, "Civil Action No. 2:22-CV-232, Disclosure of asserted claims and infringement contentions," Nov. 2022, 17 pages.
Ningde Amperex Technology Limited, "Civil Action No. 2:22-cv-232-JRG, Docket Control Order," Dec. 2022, 7 pages.
United States District Courts, "National Judicial Caseload Profile," 2022, 95 pages.
Ningde Amperex Technology Limited, "Civil Action No. 2:22-cv-232, First amended complaint for patent infringement," Aug. 2022, 18 pages.
Ningde Amperex Technology Limited, "Civil Action No. 2:22-cv-232, Complaint for patent infringement," Jun. 2022, 13 pages.
Brief filed in German Federal Patent Court for *Zhuhai CosMX Battery Co. Ltd.* vs. *Ningde Amperex Technology Limited*, File No. 3 Ni 12/23 (EP) for invalidity of EP3627606B1, Sep. 11, 2023, 37 pages.
Office Action issued on Sep. 29, 2023, in related U.S. Appl. No. 18/347,053, 12 pages.
Notice of Allowance issued on Jan. 12, 2024, in related U.S. Appl. No. 18/347,053, 9 pages.
Notice of Allowance issued on Apr. 30, 2024, in related U.S. Appl. No. 18/347,053, 8 pages.
Extended European Search Report issued on Jan. 14, 2020, in corresponding European Application No. 19198416.0, 7 pages.
Chinese First Office Action issued on Jan. 19, 2020, in corresponding Chinese Application No. 201811108529.X, 20 pages.
Notice of Acceptance of the Request for Invalidation of the Declaration issued on Jul. 28, 2022, in corresponding Chinese Application No. 201811108529.X, 44 pages.
Notice of Acceptance of the Request for Invalidation of the Declaration issued on Dec. 9, 2022, in corresponding Chinese Application No. 201811108529.X, 12 pages.
Notification to Grant Patent Right for Invention issued on Nov. 4, 2020, in corresponding Chinese Application No. 201811108529.X, 7 pages.
Notice of Transmittal of Documents issued on Sep. 19, 2022, in corresponding Chinese Application No. 201811108529.X, 82 pages.
Intention to Grant issued on May 14, 2021, in corresponding European Application No. 19198416.0, 56 pages.
Intention to Grant issued on Aug. 19, 2022, in corresponding European Application No. 21183432.0, 61 pages.
Extended European Search Report issued on Oct. 4, 2021, in corresponding European Application No. 21183432.0, 7 pages.
Extended European Search Report issued on Oct. 4, 2021, in corresponding European Application No. 21183436.1, 7 pages.
Office Action issued on Aug. 5, 2022, in corresponding European Application No. 21183436.1, 5 pages.
Office Action issued on Feb. 7, 2023, in corresponding European Application No. 21183436.1, 4 pages.
Wu et al., "Optimization approach of low temperature electrolyte for lithium-ion batteries", Chinese Battery Industry, Aug. 2017, vol. 21, No. 4, 4 pages with English Abstract provided.
YAO, "Synthesis of fluoroethylene carbonate", Chemical Engineering and Technology, Master's Thesis, Jun. 2012, 8 pages.
TCI, "1,3,6-Hexane's Chemical Safety Data Sheet", 2021, 8 pages.
TCI, "Chemical safety data sheet for ethylene glycol bis (propyl)", 2021, 8 pages.
Office Action issued on May 26, 2020, in related U.S. Appl. No. 16/211,853, 30 pages.
Notice of Allowance issued on Sep. 22, 2020, in related U.S. Appl. No. 16/211,853, 8 pages.
Office Action issued on Mar. 9, 2022, in related U.S. Appl. No. 17/064,782, 30 pages.
Notice of Allowance issued on Aug. 2, 2022, in related U.S. Appl. No. 17/064,782, 8 pages.
Office Action issued on Mar. 9, 2022, in related U.S. Appl. No. 17/064,959, 29 pages.
Notice of Allowance issued on Aug. 3, 2022, in related U.S. Patent Application No. 17/064,959, 8 pages.
English Translation of CN106848381A, Hong et al., Jun. 13, 2017, 12 pages.
European Search Report issued on Oct. 6, 2023, in corresponding European Application No. 21183436.1-1108, 7 pages.
Office Action issued on Apr. 27, 2023, in related U.S. Appl. No. 17/990,626, 41 pages.
European Search Report issued on Oct. 18, 2023, in corresponding European Application No. 23172765.2, 3 pages.
Notice of Transfer of Documents issued on Sep. 15, 2023, in corresponding Chinese Application No. 201811108529.X, 59 pages (with partial English translation).
Wang et al., "Optimization and Improvement of electrolyte production process," Tianjin Chemical Industry, 2017, vol. 31, No. 1, 3 pages.
Gang et al., "Overview of large-scale energy storage technology," Energy Engineering Technology Series, First Edition, 2017, 6 pages.
Zhuang et al., "Influence of impurities in the electrolyte solutions for Li-ion batteries and the removing methods," Chinese Battery Industry, 2006, vol. 11, No. 1, pp. 48-52.
Xiao, "Handbook of Electric Vehicle Engineering, vol. 4, Power battery," Beijing: China Machine Press, First Edition, First Press, 2019, 21 pages.
"Announcement on the investment project with an annual output of 6,000 tons of liquid lithium hexafluorophosphate entering trial production," Tinci Materials, 2017, 7 pages.
Extended Search Report issued on Jul. 22, 2024, in corresponding European Application No. 24163040.9, 4 pages.
Extended Search Report issued on Jul. 23, 2024, in corresponding European Application No. 24163045.8, 9 pages.
Extended Search Report issued on Jul. 22, 2024, in corresponding European Application No. 24167414.2, 4 pages.

\* cited by examiner

Electrode A

Electrode B

Electrode C

ELECTROLYTE AND ELECTROCHEMICAL DEVICE

CROSS REFERENCE TO THE RELATED APPLICATIONS

The present application is a continuation application of U.S. application Ser. No. 17/990,626, now U.S. Pat. No. 11,984,556, Ser. No. 17/990,626 being a continuation application of Ser. No. 17/064,782, now U.S. Pat. No. 11,522,222, which is a continuation application of U.S. application Ser. No. 16/211,853, now U.S. Pat. No. 10,833,363, where U.S. application Ser. No. 16/211,853 claims the benefit of priority from China Patent Application No. 201811108529.X, filed on 21 Sep. 2018, the disclosure of which is hereby incorporated by reference in its entirety.

1. TECHNICAL FIELD

The present disclosure relates to the technical field of energy storage technologies, in particular to an electrolyte and an electrochemical device containing the electrolyte.

2. BACKGROUND

With the rapid development of electronic devices and electric vehicles, the requirement for high capacity electrochemical devices has grown. In order to increase capacity density of electrochemical devices, there is a need for effective methods to develop high-voltage electrochemical devices.

At present, electrochemical devices with a working voltage above 4.4V have become a hot research area in many research institutes and enterprises. However, at high voltages, the oxidation activity of the positive electrode material increases, and the stability decreases, which makes the electrolyte decompose on the surface of the positive electrode easily or cause deterioration of the battery material, resulting in a decrease in battery capacity. In order to solve the above problems, it is definitely necessary to provide an improved electrochemical device.

SUMMARY

An embodiment of the present application provides an electrolyte and an electrochemical device containing the electrolyte, wherein the electrolyte comprises a compound comprising two cyano groups (herein also referred to as "a dinitrile compound"), a compound comprising three cyano groups (herein also referred to as "a trinitrile compound"), and propyl propionate. The dinitrile compound can form a protective film on the cathode of the electrochemical device, so as to inhibit the decomposition of the solvent in the electrochemical device. However, since the protective film itself is decomposed on the surface of the cathode at a high potential, the effect of inhibiting decomposition of the solvent cannot be sustained for a long time. The present inventors unexpectedly found that by using a mixture of a dinitrile compound, a trinitrile compound and propyl propionate, a firm protective film which is not easily decomposed on the surface of the cathode at a high potential can be formed. The electrolyte according to the embodiment of the present application can effectively inhibit the increase in DC internal resistance of the electrochemical device.

In an embodiment, the present application provides an electrolyte. The electrolyte comprises a dinitrile compound, a trinitrile compound, and propyl propionate, wherein, based on the total weight of the electrolyte, the weight percentage (X) of the dinitrile compound and the weight percentage (Y) of the trinitrile compound based on the total weight of the electrolyte solution meet the conditions represented by Formula (1) and Formula (2):

$$\text{about } 2 \, wt\, \% \leq (X + Y) \leq \text{about } 11 \, wt\, \%; \text{ and} \quad (1)$$

$$\text{about } 0.1 \leq (X/Y) \leq \text{about } 8. \quad (2)$$

According to an embodiment of the present application, the weight percentage (Y) of the trinitrile compound and the weight percentage (Z) of the propyl propionate based on the total weight of the electrolyte meet the condition represented by Formula (3):

$$\text{about } 0.01 \leq (Y/Z) \leq 0.3. \quad (3)$$

According to an embodiment of the present application, the weight percentage of the dinitrile compound is X, and X is about 0.01-10 wt %; the weight percentage of the trinitrile compound is Y, and Y is about 0.01-10 wt %; and the weight percentage of the propyl propionate is Z, and Z is about 5-50 wt %. The electrolyte according to the embodiments of the present application can effectively inhibit the increase in DC internal resistance of the electrochemical device, thereby achieving a better effect.

According to an embodiment of the present application, the electrolyte further comprises a fluoroether, wherein based on the total weight of the electrolyte, the content of fluoroether is about 0.01-10 wt %. The fluoroether can form a better protective film with the trinitrile compound, thereby improving the DC internal resistance and the storage performance of the electrochemical device.

According to an embodiment of the present application, the electrolyte further comprises a cyclic phosphonic anhydride, wherein, based on the total weight of the electrolyte, the content of the cyclic phosphonic anhydride is about 0.01-10 wt %. The addition of the cyclic phosphonic anhydride can further inhibit the increase in DC internal resistance during the cycle.

According to an embodiment of the present application, the electrolyte further comprises one selected from the group consisting of: a cyclic carbonate ester having a carbon-carbon double bond, a fluorinated chain carbonate ester, a fluorinated cyclic carbonate ester, a compound having a sulfur-oxygen double bond, and any combination thereof. These compounds can form a firm protective film which is not easily to be decomposed at the electrode interface with the dinitrile compound, the trinitrile compound and propyl propionate, thereby further inhibiting the side reactions in the electrochemical device and reducing the voltage drop during storage of the electrochemical device, so as to improve the long-term storage performance and reliability of the electrochemical device.

In another embodiment, the present application provides an electrochemical device and an electronic device using the electrochemical device. The electrochemical device comprises electrodes and an electrolyte which is any of the electrolyte described above.

According to an embodiment of the present application, the electrode includes a current collector and a coating on the current collector. The coating includes a single-sided coating, a double-sided coating, or a combination thereof. The single-sided coating is a coating formed by applying a slurry on one surface of the current collector. The double-sided coating is a coating formed by applying a slurry on two surfaces of the current collector. The electrode with the single-sided coating has an electrode compaction density D1, and the electrode with the double-sided coating has an electrode compaction density D2, wherein D1 and D2 meet the following relationship: about 0.8≤D1/D2≤about 1.2.

According to an embodiment of the present application, the electrode s include a cathode and an anode In some embodiments, when the electrode is an cathode, about 3.5 g/cm$^3$≤D2≤about 4.3 g/cm$^3$. In some other embodiments, when the electrode is an anode, about 1.2 g/cm$^3$≤D2≤1.8 g/cm$^3$.

In the electrochemical device according to the embodiments of the present application, when the electrolyte of the electrochemical device comprises a compound comprising two cyano groups, a compound comprising three cyano groups, and propyl propionate, and the electrode compaction densities meet the above relationships, the electrode can have good electrical conductivity, the effects of the cathode and anode active materials are well exerted, which is important to controlling the expansion of electrochemical devices. Therefore, the electrochemical device according to the embodiments of the present application achieves high capacity density and has excellent cycle and storage performances.

In another embodiment, the present application provides an electronic device including the electrochemical device.

Additional aspects and advantages of the embodiments of the present application will be partially described, illustrated or explained by way of examples in the description as follows.

BRIEF DESCRIPTION OF THE DRAWINGS

The invention will be described according to the appended drawings in which.

The drawings needed for describing the embodiments of the present application or the prior art will be briefly described below to facilitate the description of the embodiments of the present application. Obviously, the drawings in the following description are only a portion of the embodiments of the present application. For those skilled in the art, the drawings of other embodiments can be obtained according to the structures illustrated in the drawings without creative efforts.

DETAILED DESCRIPTION

Figure 1A:
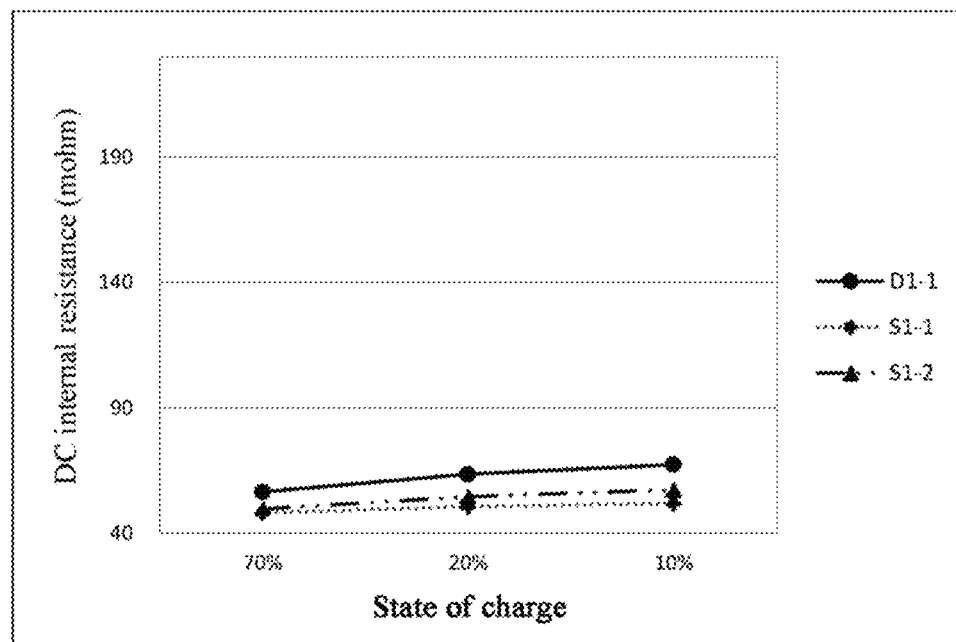
FIG. 1A shows the DC internal resistances of fresh batteries of Examples S1-1 and S1-2 of the present application and Comparative Example D1-1 at different charge states (10% SOC, 20% SOC, and 70% SOC).

Embodiments of the present application will be described in detail below. Throughout the specification of the present application, the same or similar components and components having the same or similar functions are denoted by similar reference numerals. The embodiments described herein with respect to the figures are explanatory, and illustrative, and are provided to facilitate the basic understanding of the application. The embodiments of the present application should not be interpreted as limitations to the present application. Unless otherwise expressly indicated, the following terms used herein have the meanings indicated below.

As used herein, the term "about" is used to describe and depict minor variations. When used in connection with an event or circumstance, the term may refer to an example in which the event or circumstance occurs precisely, and an example in which the event or circumstance occurs approximately. For example, when used in connection with a value, the term may refer to a range of variation less than or equal to ±10% of the stated value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. In addition, amounts, ratios, and other values are sometimes presented in a range format in this application. It is to be understood that such a range format is provided for convenience and simplicity, and should be understood flexibly to include not only the numerical values that are explicitly defined in the range, but also all the individual values or sub-ranges that are included in the range, as if each value and sub-range are explicitly specified.

As used herein, "hydrocarbyl" covers alkyl, alkenyl, and alkynyl groups. For example, the hydrocarbyl may be a straight-chain hydrocarbon structure having 1 to 20 carbon atoms. The hydrocarbon group also may be a branched or cyclic hydrocarbon structure having 3 to 20 carbon atoms. When a hydrocarbon group having a specific number of carbon atoms is defined, it may cover all geometric isomers having the carbon number. The hydrocarbon group herein may also be a hydrocarbon group having 1 to 15 carbon atoms, a hydrocarbon group having 1 to 10 carbon atoms, a hydrocarbon group having 1 to 5 carbon atoms, a hydrocarbon group having 5 to 20 carbon atoms, a hydrocarbon group having 5 to 15 carbon atoms or a hydrocarbon group having 5 to 10 carbon atoms. Additionally, the hydrocarbon group may be optionally substituted. For example, the hydrocarbon group may be substituted by halo including fluorine, chlorine, bromine, and iodine, an alkyl group, an aryl group or a heteroaryl group.

As used herein, the "alkyl group" may be a linear saturated hydrocarbon structure having 1 to 20 carbon atoms. The alkyl group also may be a branched or cyclic hydrocarbon structure having 3 to 20 carbon atoms. For example, the alkyl group may be an alkyl group having 1-20 carbon atoms, an alkyl group having 1-10 carbon atoms, an alkyl group having 1-5 carbon atoms, an alkyl group having 5-20 carbon atoms, an alkyl group having 5-15 carbon atoms, or alkyl group having 5-10 carbon atoms. When an alkyl group having a specific number of carbon atoms is defined, it may cover all geometric isomers having the carbon number. Therefore, for example, "butyl" means n-butyl, sec-butyl, isobutyl, tert-butyl and cyclobutyl; and "propyl" includes n-propyl, isopropyl and cyclopropyl. Examples of the alkyl group include, but are not limited to, methyl, ethyl, n-propyl, isopropyl, cyclopropyl, n-butyl, isobutyl, sec-butyl, tert-butyl, cyclobutyl, n-pentyl, isoamyl, neopentyl, cyclopentyl, methylcyclopentyl, ethylcyclopentyl, n-hexyl, isohexyl, cyclohexyl, n-heptyl, octyl, cyclopropyl, cyclobutyl, norbornanyl and so on. Additionally, the alkyl group may be optionally substituted.

As used herein, the term "alkylene group" means a linear or branched divalent saturated hydrocarbon group. For example, the alkylene group may be an alkylene group having 1-20 carbon atoms, an alkylene group having 1-15 carbon atoms, an alkylene group having 1-10 carbon atoms, an alkylene group having 1-5 carbon atoms, an alkylene group having 5-20 carbon atoms, an alkylene group having 5-15 carbon atoms, or alkylene group having 5-10 carbon atoms. Representative alkylene group includes (for example) methylene, ethane-1,2-diyl ("ethylene"), propane-1,2-diyl, propane-1,3-diyl, butane-1,4-diyl, pentane-1,5-diyl and the like. Additionally, the alkylene group may be optionally substituted.

As used herein, the term "alkenylene group" covers both linear and branched alkenylene groups. When an alkenylene group having a specific number of carbon atoms is defined, it may cover all geometric isomers having the carbon number. For example, the alkenylene group may be an alkenylene group having 2-20 carbon atoms, an alkenylene group having 2-15 carbon atoms, an alkenylene group having 2-10 carbon atoms, an alkenylene group having 2-5 carbon atoms, an alkenylene group having 5-20 carbon atoms, an alkenylene group having 5-15 carbon atoms, or alkenylene group having 5-10 carbon atoms. Representative alkenylene group includes (for example) ethenylene, propenylene, butenylene and the like. Additionally, the alkenylene group may be optionally substituted.

As used herein, the term "aryl" encompasses both monocyclic and polycyclic systems. A polycyclic ring may have two or more rings in which two carbons are shared by two adjacent rings (where the rings are "fused"), in which at least one of the rings is aromatic and other rings may be for example, a cycloalkyl group, a cycloalkenyl group, an aryl group, a heterocyclyl group and/or a heteroaryl group. For example, the aryl group may be a $C_6$-$C_{50}$ aryl group, a $C_6$-$C_{40}$ aryl group, a $C_6$-$C_{30}$ aryl group, a $C_6$-$C_{20}$ aryl group, or a $C_6$-$C_{10}$ aryl group. Representative aryl group includes (for example) phenyl, methylphenyl, propylphenyl, isopropylphenyl, benzyl and naphthalen-1-yl, naphthalen-2-yl and the like. Additionally, the aryl group may be optionally substituted.

As used herein, the term "heteroaryl group" covers a monocyclic heteroaromatic group which may include one to three heteroatoms, for example, pyrrole, furan, thiophene, imidazole, oxazole, thiazole, triazole, pyrazole, pyridine, pyrazine, pyrimidine, and the like. The term heteroaryl group also includes a polycyclic heteroaromatic system having two or more rings in which two atoms are shared by two adjacent rings (where the ring is "fused"), in which at least one of the rings is a heteroaryl group, and other rings may be a cycloalkyl group, a cycloalkenyl group, an aryl group, a heterocyclyl group and/or a heteroaryl group. The heteroatom in the heteroaryl group may be for example O, S, N, Se, and so on. For example, the heteroaryl group may be a $C_2$-$C_{50}$ heteroaryl group, a $C_2$-$C_{40}$ heteroaryl group, a $C_2$-$C_{30}$ heteroaryl group, a $C_2$-$C_{20}$ heteroaryl group, or a $C_2$-$C_{10}$ heteroaryl group. Additionally, the aryl group may be optionally substituted.

When the above substituents are substituted, the substituent is selected from the group consisting of halogen, an alkyl group, a cycloalkyl group, an alkenyl group, an aryl group, and a heteroaryl group.

As used herein, the content of each component is obtained based on the total weight of the electrolyte.

I. Electrolyte

An embodiment of the present application provides an electrolyte, which comprises an electrolyte and a solvent in which the electrolyte is dissolved. It is one of the main characteristics of the electrolyte of the present application that the electrolyte comprises a dinitrile compound, a trinitrile compound, and propyl propionate, wherein, based on the total weight of the electrolyte, the weight percentage of the is X and the weight percentage of the trinitrile compound is Y, and X and Y meet the conditions represented by Formula (1) and Formula (2):

$$\text{about } 2 \ wt\ \% \leq (X+Y) \leq \text{about } 11 \ wt\ \%; \text{ and} \quad (1)$$

$$\text{about } 0.1 \leq (X/Y) \leq \text{about } 8. \quad (2)$$

In some embodiments, X and Y meet about 2 wt %≤(X+Y)≤about 8 wt % and about 0.1≤(X/Y)≤about 6 simultaneously. In some embodiments, X and Y meet about 3 wt %≤(X+Y)≤6 wt % and about 0.2≤(X/Y)≤about 5 simultaneously. In some embodiments, X and Y meet about 4 wt %≤(X+Y)≤about 5 wt % and about 0.3≤(X/Y)≤about 4 simultaneously. In some embodiments, X and Y meet about 2 wt %≤(X+Y)≤about 5 wt % and about 0.1≤(X/Y)≤about 1 simultaneously.

In some embodiments, based on the total weight of the electrolyte, the weight percentage of the trinitrile compound is Y and the weight percentage of the propyl propionate is Z, and Y and Z meet the condition represented by Formula (3):

$$\text{about } 0.01 \leq (Y/Z) \leq \text{about } 0.3. \quad (3)$$

In some embodiments, Y and Z meet about 0.01≤(Y/Z)≤about 0.2. In some embodiments, Y and Z meet about 0.02≤(Y/Z)≤about 0.1.

In some embodiments, the weight percentage of the dinitrile compound is about 0.01-10 wt %. In some embodiments, the weight percentage of the dinitrile compound is not less than about 0.01 wt %, not less than about 0.1 wt %, not less than about 0.3 wt %, or not less than about 0.5 wt %. In some embodiments, the weight percentage of the dinitrile compound is not greater than about 10 wt %, not greater than about 8 wt %, or not greater than about 6 wt %.

In some embodiments, the weight percentage of the trinitrile compound is about 0.01-10 wt %. In some embodiments, the weight percentage of the trinitrile compound is not less than about 0.01 wt %, not less than about 0.1 wt %, not less than about 0.3 wt %, or not less than about 0.5 wt %. In some embodiments, the weight percentage of the trinitrile compound is not greater than about 10 wt %, not greater than about 8 wt %, not greater than about 5 wt %, not greater than about 4 wt %, or not greater than about 3 wt %.

In some embodiments, the weight percentage of the propyl propionate is about 5-50 wt %. In some embodiments, the weight percentage (Z) of the propyl propionate is about 5-40 wt %, about 10-40 wt %, about 10-30 wt %, about 20-50 wt %, about 20-40 wt %, about 20-30 wt %, or about 25-30 wt %.

Compound Comprising Two Cyano Groups (Dinitrile Compound)

In some embodiments, the dinitrile compound according to the present application includes a compound of Formula [4] or [5]:

[4]

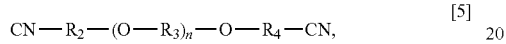

[5]

or a combination thereof, wherein in Formula [4] or [5], $R_1$, $R_2$, $R_3$ and $R_4$ are each independently an alkylene having 1-20 carbon atoms, for example, an alkylene group having 1-15 carbon atoms, an alkylene group having 1-10 carbon atoms, an alkylene group having 1-5 carbon atoms, an alkylene group having 5-10 carbon atoms, an alkylene group having 5-20 carbon atoms, an alkylene group having 5-15 carbon atoms, an alkenylene group having 2-20 carbon atoms, an alkenylene group having 2-15 carbon atoms, an alkenylene group having 2-10 carbon atoms, an alkenylene group having 2-5 carbon atoms, an alkenylene group having 5-20 carbon atoms, an alkenylene group having 5-15 carbon atoms, or an alkenylene group having 5-10 carbon atoms, and n is an integer from 0 to 5.

In some embodiments, the dinitrile compound according to the present application is a compound of Formula [4] or [5].

In some embodiments, the dinitrile compound of the present application includes, but is not limited to, butanedinitrile, glutaronitrile, adiponitrile, 1,5-dicyanopentane, 1,6-dicyanohexane, 1,7-dicyanoheptane, 1,8-dicyanooctane, 1,9-dicyanononane, 1,10-dicyanodecane, 1,12-dicyanododecane, tetramethylbutanedinitrile, 2-methylglutaronitrile, 2,4-dimethylglutaronitrile, 2,2,4,4-tetramethylglutaronitrile, 1,4-dicyanopentane, 2,6-dicyanoheptane, 2,7-dicyanooctane, 2,8-dicyanononane, 1,6-dicyanodecane, 1,2-dicyanobenzene, 1,3-dicyanobenzene, 1,4-dicyanobenzene, 3,5-dioxa-pimelonitrile, 1,4-bis(cyanoethoxy)butane, ethylene glycol bis(2-cyanoethyl)ether, diethylene glycol bis(2-cyanoethyl)ether, triethylene glycol bis(2-cyanoethyl)ether, tetraethylene glycol bis(2-cyanoethyl)ether, 3,6,9,12,15,18-hexaoxaeicosanoic dinitrile, 1,3-bis(2-cyanoethoxy) propane, 1,4-bis(2-cyanoethoxy)butane, 1,5-bis(2-cyanoethoxy)pentane, ethylene glycol bis(4-cyanobutyl) ether, 1,4-dicyano-2-butene, 1,4-dicyano-2-methyl-2-butene, 1,4-dicyano-2-ethyl-2-butene, 1,4-dicyano-2,3-dimethyl-2-butene, 1,4-dicyano-2,3-diethyl-2-butene, 1,6-dicyano-3-hexene, 1,6-dicyano-2-methyl-3-hexene, or 1,6-dicyano-2-methyl-5-methyl-3-hexene. The dinitrile compounds may be used alone or in combination of two or more thereof.

Compound Comprising Three Cyano Groups (Trinitrile Compound)

In some embodiments, the trinitrile compound according to the present application includes a compound of Formula [6] or [7]:

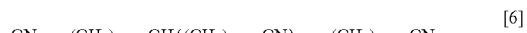

[6]

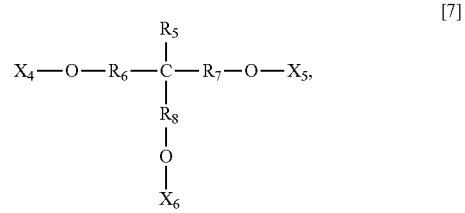

[7]

or a combination thereof, wherein in Formula [6], x, y, and z represents an integer from 0 to 5 and x, y, and z are not 0 at the same time; and in Formula [7], $R_5$ may be hydrogen or an alkyl group having 1-20 carbon atoms, for example, an alkyl group having 1-10 carbon atoms, an alkyl group having 1-5 carbon atoms, an alkyl group having 5-20 carbon atoms, an alkyl group having 5-15 carbon atoms, or an alkyl group having 5-10 carbon atoms; $R_6$, $R_7$, and $R_8$ each independently may be an alkylene group having 1-20 carbon atoms, for example, an alkylene group having 1-15 carbon atoms, an alkylene group having 1-10 carbon atoms, an alkylene group having 1-5 carbon atoms, an alkylene group having 5-20 carbon atoms, an alkylene group having 5-15 carbon atoms, or an alkylene group having 5-10 carbon atoms; and $X_4$, $X_5$ and $X_6$ each independently may be —$R_9$—CN, wherein $R_9$ may be an alkylene group having 1-20 carbon atoms, for example, an alkylene group having 1-15 carbon atoms, an alkylene group having 1-10 carbon atoms, an alkylene group having 1-5 carbon atoms, an alkylene group having 5-20 carbon atoms, an alkylene group having 5-15 carbon atoms, or an alkylene group having 5-10 carbon atoms.

In some embodiments, the trinitrile compound according to the present application is a compound of Formula [6] or [7].

In some embodiments, the trinitrile compound of the present application includes, but is not limited to, 1,3,5-pentanetricarbonitrile, 1,2,3-propanetrinitrile, 1,3,6-hexanetricarbonitrile, 1,2,6-hexanetricarbonitrile, 1,2,3-tris(2-cyanoethoxy)propane, 1,2,4-tris(2-cyanoethoxy)butane, 1,1,1-tris(cyanoethoxymethylene)ethane, 1,1,1-tris(cyanoethoxymethylene)propane, 3-methyl-1,3,5-tris(cyanoethoxy)pentane, 1,2,7-tris(cyanoethoxy)heptane, 1,2,6-tris(cyanoethoxy)hexane, or 1,2,5-tris(cyanoethoxy)pentane. The trinitrile compounds may be used alone or in combination of two or more thereof.

Fluoroether Compound

In some embodiments, the fluoroether compound of the present application includes at least one of the compounds of Formula [8], Formula [9], Formula [10], or Formula [11]:

[8]

[9]

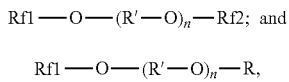
[10]

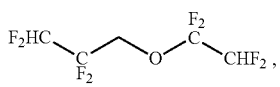
[11]

where in Formulae [8], [9], [10], and [11], Rf1 and Rf2 are each independently a linear or branched $C_1$ to $C_{12}$ fluoroalkyl group at least one hydrogen atom of which is replaced with fluorine, R is a linear or branched $C_1$ to $C_{12}$ alkyl group, and R' is a linear or branched $C_1$ to $C_5$ alkylene group, and n is an integer from 1 to 5.

In some embodiments, the fluoroether compound of the present application is a compound of Formula [8], Formula [9], Formula [10], or Formula [11].

In some embodiments, Rf1 or Rf2 is each independently a fluoroalkyl group selected from the group consisting of $HCF_2-$, $CF_3-$, $HCF_2CF_2-$, $CH_3CF_2-$, $CF_3CH_2-$, $CF_3CF_2-$, $(CF_3)_2CH-$, $HCF_2CF_2CH_2-$, $CF_3CH_2CH_2-$, $HCF_2CF_2CF_2CH_2-$, $HCF_2CF_2CF_2CF_2CH_2-$, $CF_3CF_2CH_2-$, $CF_3CFHCF_2CH_2-$, $HCF_2CF(CF_3)CH_2-$, and $CF_3CF_2CH_2CH_2-$.

The fluoroether can form a better protective film with the trinitrile compound, thereby further improving the DC internal resistance and the storage performance of the battery.

In some embodiments, the fluoroether of the present application includes, but is not limited to:

$HCF_2CF_2CH_2OCF_2CF_2H$(FEPE), $(CF_3)_2CFCF(CF_2CF_3)(OCH_3)$ (TMMP), $CF_3CHFCF_2CH(CH_3)OCF_2CHFCF_3$(TPTP), $HCF_2CF_2CH_2OCF_2CF_2CF_2CF_2H$, $HCF_2CF_2OCH_2CF_3$, $HCF_2CF_2OCH_2CH_2OCF_2CF_2H$, $HCF_2CF_2OCH_2CH_2CH_2OCF_2CF_2H$, $HCF_2CF_2CH_2OCF_2CF_2CF_2H$, $HCF_2CF_2OCH_2CH_2OCF_2CF_2CF_2H$, $HCF_2CF_2OCH_2CH_2CH_2OCF_2CF_2CF_2H$, $CH_3OCH_2CH_2OCH_2CH_2F$, $CH_3OCH_2CH_2OCH_2CF_3$, $CH_3OCH_2CH(CH_3)OCH_2CH_2F$, $CH_3OCH_2CH(CH_3)OCH_2CF_3$, $FCH_2CH_2OCH_2CH_2OCH_2CH_2F$, $FCH_2CH_2OCH_2CH(CH_3)OCH_2CH_2F$, $CF_3CH_2O(CH_2CH_2O)_2CH_2CF_3$ or $CF_3CH_2OCH_2CH(CH_3)OCH_2CF_3$. The fluoroether may be used alone or in combination of two or more thereof.

The structural formulas of FEPE, TMMP, and TPTP are shown below:

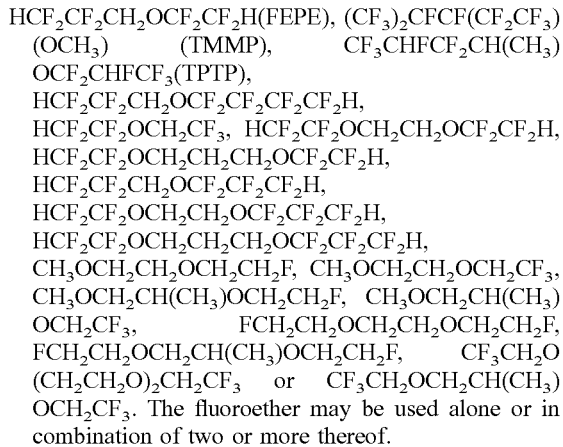

(FEPE)
1,1-difluoro-2,2-difluoroethyl-2',2'-difluoro-3',3'-difluoropropyl ether (TMMP)
2-trifluoromethyl-3-methoxyperfluoropentane

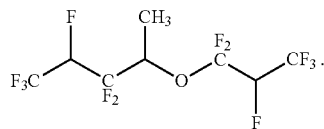

(TPTP)
2-trifluoro-2-fluoro-3-difluoropropoxy-3-difluoro-4-fluoro-5-trifluoropentane In some embodiments, based on the total weight of the electrolyte, the content of the fluoroether is not less than about 0.01 wt %, not less than about 0.1 wt %, or not less than about 0.5 wt %. In some embodiments, the content of the fluoroether is not greater than about 5 wt %, not greater than about 4 wt %, not greater than about 3 wt %, or not greater than about 2 wt %.

Cyclic Phosphonic Anhydride Compound

In some embodiments, the cyclic phosphonic anhydride according to the present application includes one or more of the compounds of Formula [12]:

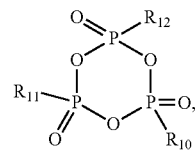
[12]

wherein in Formula [12], $R_{10}$, $R_{11}$, and $R_{12}$ each independently may be hydrogen; each independently may be an alkyl group having 1-20 carbon atoms, for example, an alkyl group having 1-15 carbon atoms, an alkyl group having 1-10 carbon atoms, an alkyl group having 1-5 carbon atoms, an alkyl group having 5-20 carbon atoms, an alkyl group having 5-15 carbon atoms, and an alkyl group having 5-10 carbon atoms; and each independently may be an aryl group having 6-50 carbon atoms, for example, an aryl group having 6-30 carbon atoms, an aryl group having 6-26 carbon atoms, an aryl group having 6-20 carbon atoms, an aryl group having 10-50 carbon atoms, an aryl group having 10-30 carbon atoms, an aryl group having 10-26 carbon atoms, or an aryl group having 10-20 carbon atoms, wherein $R_{10}$, $R_{11}$, and $R_{12}$ may be different from or the same as each other, or any two of them are the same.

In some embodiments, the cyclic phosphonic anhydride compound of the present application includes, but is not limited to, compounds of following formulae, which may be used alone, or in combination of two or more thereof:

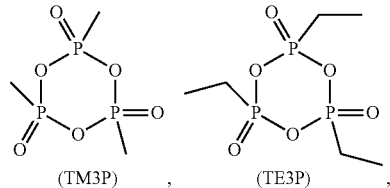

(TM3P) , (TE3P) ,

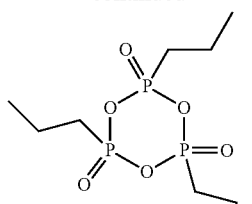
(T3P),
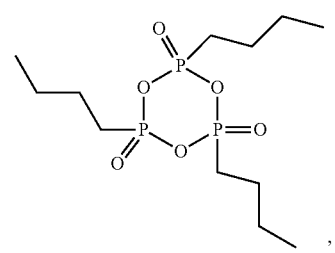
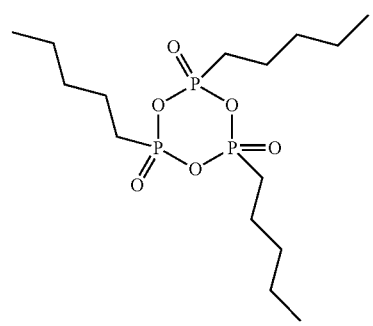
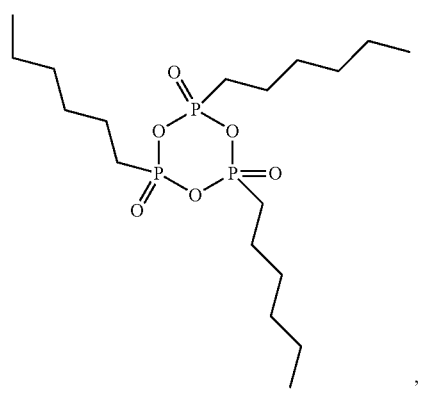
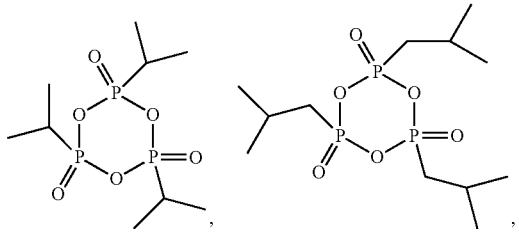
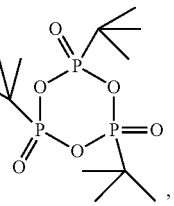
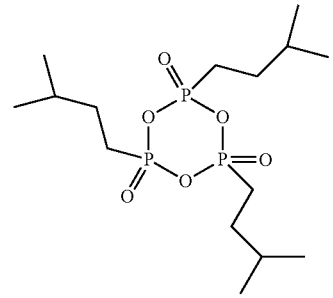
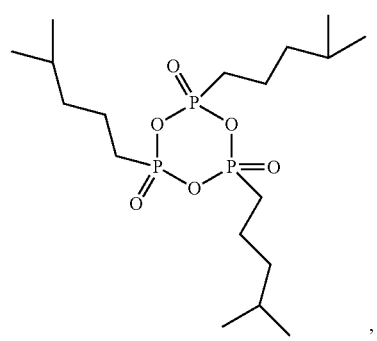
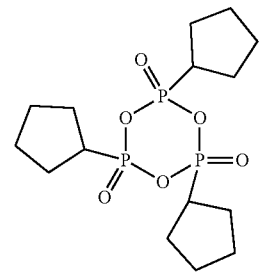
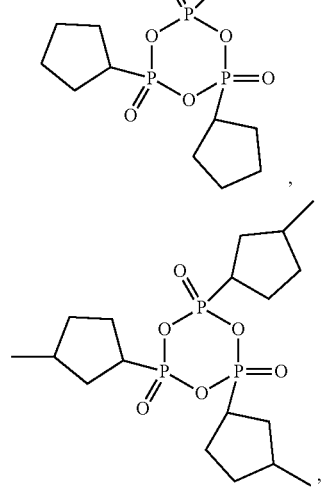
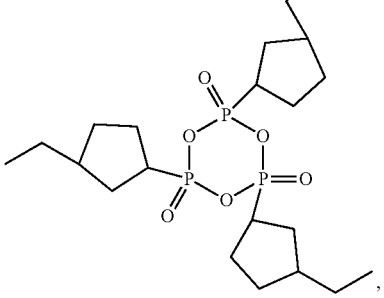

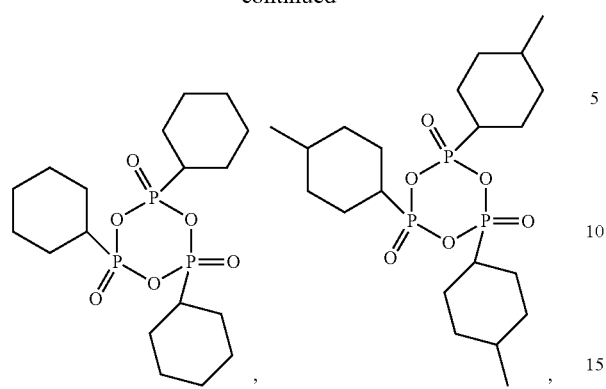

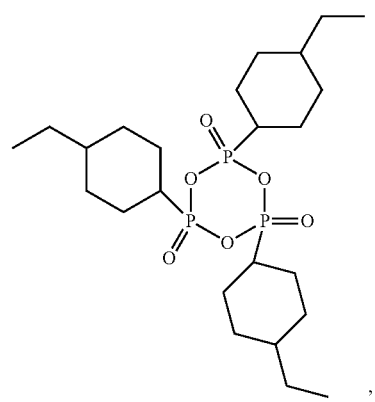

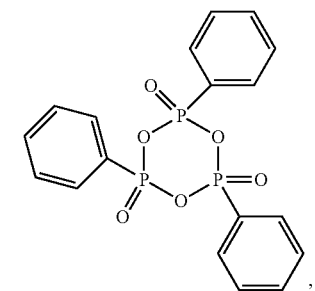

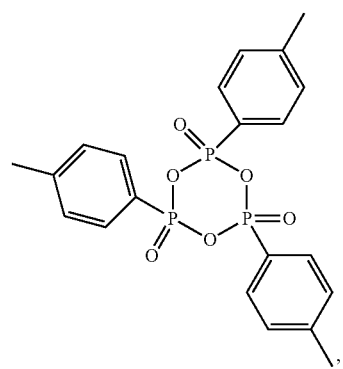

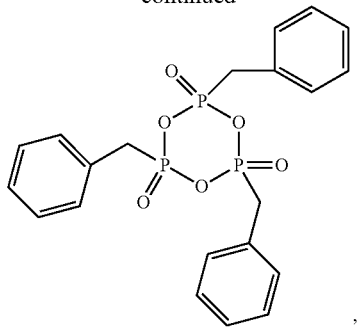

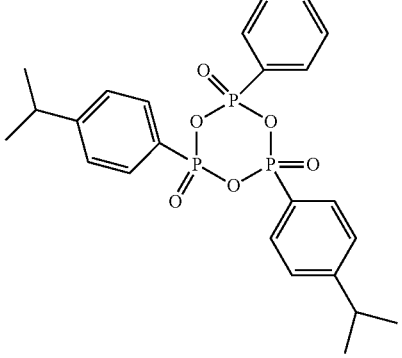

In some embodiments, based on the total weight of the electrolyte, the content of the cyclic phosphonic anhydride is not less than about 0.01 wt % or not less than about 0.1 wt %. In some embodiments, the content of the cyclic phosphonic anhydride is not less than about 0.3 wt % or not less than about 0.5 wt %. In some embodiments, the content of the cyclic phosphonic anhydride is not greater than about 4 wt % or not greater than about 3 wt %.

Other Additives

The electrolyte of the present application may further comprises one or more selected from the group consisting of: a cyclic carbonate ester having a carbon-carbon double bond, a fluoro chain carbonate ester, a fluorinated cyclic carbonate ester, or a compound having a sulfur-oxygen double bond.

In some embodiments, the cyclic carbonate ester having a carbon-carbon double bond useful in the present application includes, but is not limited to: vinylene carbonate, methyl vinylene carbonate, ethyl vinylene carbonate, 1,2- dimethyl vinylene carbonate, 1,2-diethyl vinylene carbonate, fluorovinylene carbonate, and trifluoromethylvinylene carbonate; vinyl ethylene carbonate, 1-methyl-2-vinylethylene carbonate, 1-ethyl-2-vinylethylene carbonate, 1-n-propyl-2-vinylethylene carbonate, 1-methyl-2-vinylethylene carbonate, 1,1-divinylethylene carbonate, and 1,2-divinylethylene carbonate; and 1,1-dimethyl-2-methylene ethylene carbonate, and 1,1-diethyl-2-methylene ethylene carbonate. The cyclic carbonate ester having a carbon-carbon double bond may be used alone or in combination of two or more thereof.

In some embodiments, based on the total weight of the electrolyte, the content of the cyclic carbonate ester having a carbon-carbon double bond is not less than about 0.01 wt %, not less than about 0.1 wt %, or not less than about 0.3 wt %. In some embodiments, the content of the cyclic carbonate ester having a carbon-carbon double bond is not less than about 0.5 wt %. In some embodiments, the content of the cyclic carbonate ester having a carbon-carbon double bond is not greater than about 5 wt %, not greater than about 3 wt %, or not greater than about 1 wt %.

In some embodiments, the fluorinated chain carbonate ester according to the present application includes, but is not limited to: fluoromethmetyl carbonate, difluoromethmethyl carbonate, trifluoromethmethyl carbonate, trifluoroethmethyl carbonate, or bis(trifluoroethyl) carbonate. The fluorinated chain carbonate ester may be used alone or in combination of two or more thereof.

In some embodiments, based on the total weight of the electrolyte, the content of the fluorinated chain carbonate ester is not less than about 0.01 wt % or not less than about 0.1 wt %. In some embodiments, the content of the fluorinated chain carbonate ester is not less than about 0.3 wt %. In some embodiments, the content of the fluorinated chain carbonate ester is not less than about 0.5 wt %. In some other embodiments, the content of the fluorinated chain carbonate ester is not greater than about 3 wt % or not greater than about 5 wt %. In some other embodiments, the content of the fluorinated chain carbonate ester is not greater than about 1 wt %. In some embodiments, the fluorinated cyclic carbonate ester according to the present application includes, but is not limited to, fluoroethylene carbonate, 4,4-difluoroethylene carbonate, 4,5-difluoroethylene carbonate, 4-fluoro-4-methylethylene carbonate, 4,5-difluoro-4-methylethylene carbonate, 4-fluoro-5-methylethylene carbonate, 4,4-difluoro-5-methylethylene carbonate, 4-(fluoromethyl)-ethylene carbonate, 4-(difluoromethyl)-ethylene carbonate, 4-(trifluoromethyl)-ethylene carbonate, 4-(fluoromethyl)-4-fluoroethylene carbonate, 4-(fluoromethyl)-5-fluoroethylene carbonate, 4-fluoro-4,5-dimethylethylene carbonate, 4,5-difluoro-4,5-dimethylethylene carbonate, and 4,4-difluoro-5,5-dimethylethylene carbonate. The fluorinated cyclic carbonate esters may be used alone or in combination of two or more thereof.

In some embodiments, the content of the fluorinated cyclic carbonate ester is not less than about 0.1 wt % based on the total weight of the electrolyte. In some embodiments, the content of the fluoro cyclic carbonate ester is not less than about 0.5 wt %. In some embodiments, the content of the fluorinated cyclic carbonate ester is not less than about 2 wt %. In some embodiments, the content of the fluorinated cyclic carbonate ester is not less than about 4 wt %. In some embodiments, the content of the fluorinated cyclic carbonate ester is not greater than about 15 wt %. In some embodiments, the content of the fluorinated cyclic carbonate ester is not greater than about 10 wt %. In some embodiments, the content of the fluorinated cyclic carbonate ester is not greater than about 8 wt %.

In some embodiments, the compound having a sulfur-oxygen double bond according to the present application includes, but is not limited to: a cyclic sulfate ester, a chain sulfate ester, a chain sulfonate ester, a cyclic sulfonate ester, a chain sulfite ester, a cyclic sulfite ester, a chain sulfone, a cyclic sulfones, and so on. The compound having a sulfur-oxygen double bond may be used alone or in combination of two or more thereof.

In some embodiments, based on the total weight of the electrolyte, the content of the compound having a sulfur-oxygen double bond is not less than about 0.01 wt %. In some embodiments, the content of the compound having a sulfur-oxygen double bond is not less than about 0.1 wt %. In some embodiments, the content of the compound having a sulfur-oxygen double bond is not less than about 0.3 wt %. In some embodiments, the content of the compound having a sulfur-oxygen double bond is not less than about 0.5 wt %. In some other embodiments, the content of the compound having a sulfur-oxygen double bond is not greater than about 5 wt %. In some embodiments, the content of the compound having a sulfur-oxygen double bond is not greater than about 4 wt %. In some embodiments, the content of the compound having a sulfur-oxygen double bond is not greater than about 3 wt %.

In some embodiments, the cyclic sulfate ester according to the present application includes, but is not limited to: 1,2-ethylene glycol sulfate, 1,2-propylene glycol sulfate, 1,3-propylene glycol sulfate, 1,2-butylene glycol sulfate, 1,3-butylene glycol sulfate, 1,4-butylene glycol sulfate, 1,2-pentylene glycol sulfate, 1,3-pentylene glycol sulfate, 1,4-pentylene glycol sulfate, and 1,5-pentylene glycol sulfate. The cyclic sulfate ester may be used alone or in combination of two or more thereof.

In some embodiments, the chain sulfate ester according to the present application includes, but is not limited to: a dialkyl sulfate such as dimethyl sulfate, methyl ethyl sulfate, and diethyl sulfate. The chain sulfate ester may be used alone or in combination of two or more thereof.

In some embodiments, the chain sulfonate ester according to the present application includes, but is not limited to: methyl fluorosulfonate, ethyl fluorosulfonate, methyl methanesulfonate, ethyl methanesulfonate, butyl dimesylate, methyl 2-(methylsulfonyloxy)propionate, ethyl 2-(methylsulfonyloxy)propionate, methyl methylsulfonyloxyacetate, ethyl methylsulfonyloxyacetate, phenyl methylsulfonate, and pentafluorophenyl methylsulfonate. The chain sulfonate ester may be used alone or in combination of two or more thereof.

In some embodiments, the cyclic sulfonate ester according to the present application includes, but is not limited to: 1,3-propanesultone, 1-fluoro-1,3-propanesultone, 2-fluoro-1,3-propanesultone, 3-fluoro-1,3-propanesultone, 1-methyl-1,3-propanesultone, 2-methyl-1,3-propanesultone, 3-methyl-1,3-propanesultone, 1-propene-1,3-sultone, 2-propene-1,3-sultone, 1-fluoro-1-propene-1,3-sultone, 2-fluoro-1-propene-1,3-sultone, 3-fluoro-1-propene-1,3-sultone, 1-fluoro-2-propene-1,3-sultone, 2-fluoro-2-propene-1,3-sultone, 3-fluoro-2-propene-1,3-sultone, 1-methyl-1-propene-1,3-sultone, 2-methyl-1-propene-1,3-sultone, 3-methyl-1-propene-1,3-sultone, 1-methyl-2-propene-1,3-sultone, 2-methyl-2-propene-1,3-sultone, 3-methyl-2-propene-1,3-sultone, 1,4-butane sultone, 1,5-pentane sultone, methylene methanedisulfonate, and ethylene methanedisulfonate. The cyclic sulfonate ester may be used alone or in combination of two or more thereof.

In some embodiments, the chain sulfite ester according to the present application includes, but is not limited to: dimethyl sulfite, methyl ethyl sulfite, and diethyl sulfite. The chain sulfite ester may be used alone or in combination of two or more thereof.

In some embodiments, the cyclic sulfite ester according to the present application includes, but is not limited to: 1,2-ethylene glycol sulfite, 1,2-propylene glycol sulfite, 1,3-propylene glycol sulfite, 1,2-butylene glycol sulfite, 1,3-butylene glycol sulfite, 1,4-butylene glycol sulfite, 1,2-pentylene glycol sulfite, 1,3-pentylene glycol sulfite, 1,4-pentylene glycol sulfite, and 1,5-pentylene glycol sulfite. The cyclic sulfite ester may be used alone or in combination of two or more thereof.

In some embodiments, the chain sulfone ester according to the present application includes, but is not limited to: a dialkyl sulfone compound such as dimethyl sulfone, and diethyl sulfone.

In some embodiments, the cyclic sulfone according to the present application includes, but is not limited to: sulfolane, methyl sulfolane, 4,5-dimethyl sulfolane, and sulfolene. The cyclic sulfone may be used alone or in combination of two or more thereof.

Electrolyte

The electrolyte used in the electrolyte according to the embodiments of the present application may be an electrolyte known in the prior art, including, but not limited to: an inorganic lithium salt, for example $LiClO_4$, $LiAsF_6$, $LiPF_6$, $LiBF_4$, $LiSbF_6$, $LiSO_3F$, and $LiN(FSO_2)_2$; a fluorine-containing organic lithium salt, for example $LiCF_3SO_3$, $LIN(FSO_2)(CF_3SO_2)$, $LIN(CF_3SO_2)_2$, $LIN(C_2F_5SO_2)_2$, cyclic lithium 1,3-hexafluoropropane disulfonimide, cyclic lithium 1,2-tetrafluoroethane disulfonimide, $LiN(CF_3SO_2)(C_4F_9SO_2)$, $LiC(CF_3SO_2)_3$, $LiPF_4(CF_3)_2$, $LiPF_4(C_2F_5)_2$, $LiPF_4(CF_3SO_2)_2$, $LiPF_4(C_2F_5SO_2)_2$, $LiBF_2(CF_3)_2$, $LiBF_2(C_2F_5)_2$, $LiBF_2(CF_3SO_2)_2$, and $LiBF_2(C_2F_5SO_2)_2$; and a lithium salt containing a dicarboxylic acid complex, for example, lithium bis(oxalato)borate, lithium difluoro(oxalato)borate, lithium tris(oxalato)phosphate, lithium difluorobis(oxalato)phosphate, and lithiumtetrafluoro(oxalato)phosphate. In addition, the electrolyte may be used alone or in combination of two or more thereof. For example, in some embodiments, the electrolyte includes a combination of $LiPF_6$ and $LiBF_4$. In some embodiments, the electrolyte includes a combination of an inorganic lithium salt such as $LiPF_6$ or $LiBF_4$ and a fluorine-containing organic lithium salt such as $LiCF_3SO_3$, $LIN(CF_3SO_2)_2$, or $LIN(C_2F_5SO_2)_2$. In some embodiments, the concentration of the electrolyte is in the range of about 0.8-about 3 mol/L, for example, about 0.8-about 2.5 mol/L, about 0.8-about 2 mol/L, about 1-about 2 mol/L, for example, 1 mol/L, 1.15 mol/L, 1.2 mol/L, 1.5 mol/L, 2 mol/L or 2.5 mol/L.

Solvent

The solvent used in the electrolyte according to the embodiments of the present application may be any non-aqueous solvent known in the art as a solvent for an electrolyte.

In some embodiments, the non-aqueous solvent useful in the present application includes, but is not limited to: a cyclic carbonate ester, a chain carbonate ester, a cyclic carboxylate ester, a chain carboxylate ester, a cyclic ether, a chain ether, a phosphorus-containing organic solvent, a sulfur-containing organic solvent, an aromatic fluorine-containing solvent or any combination thereof.

In some embodiments, the cyclic carbonate ester according to the present application generally has 3-6 carbon atoms, and includes, but is not limited to: for example, ethylene carbonate, propylene carbonate, butylene carbonate, and other cyclic carbonates.

In some embodiments, the chain carbonate ester according to the present application includes, but is not limited to: a chain carbonate ester such as dimethyl carbonate, ethyl methyl carbonate, diethyl carbonate, methyl n-propyl carbonate, ethyl n-propyl carbonate, and di-n-propyl carbonate; and a fluorinated chain carbonate ester, for example, bis(fluoromethyl) carbonate, bis(difluoromethyl) carbonate, bis(trifluoromethyl) carbonate, bis(2-fluoroethyl) carbonate, bis(2,2-difluoroethyl) carbonate, bis(2,2,2-trifluoroethyl) carbonate, 2-fluoroethylmethyl carbonate, 2,2-difluoroethylmethyl carbonate, and 2,2,2-trifluoroethylmethyl carbonate.

In some embodiments, the cyclic carboxylate ester according to present application includes, but is not limited to: γ-butyrolactone, γ-valerolactone, and the like, and a cyclic carboxylate ester some hydrogen atoms of which are substituted with fluorine.

In some embodiments, the chain carboxylate ester according to the present application includes, but is not limited to: methyl acetate, ethyl acetate, propyl acetate, isopropyl acetate, butyl acetate, sec-butyl acetate, isobutyl acetate, tert-butyl acetate, methyl propionate, ethyl propionate, propyl propionate, isopropyl propionate, methyl butyrate, ethyl butyrate, propyl butyrate, methyl isobutyrate, ethyl isobutyrate, methyl valerate, ethyl valerate, methyl pivalate and ethyl pivalate or the like, and a chain carboxylate ester some hydrogen atoms of which are substituted with fluorine. The fluorinated chain carboxylate ester includes, but is not limited to: methyl trifluoroacetate, ethyl trifluoroacetate, propyl trifluoroacetate, butyl trifluoroacetate and 2,2,2-trifluoroethyl trifluoroacetate.

In some embodiments, the cyclic ether according to the present application includes, but is not limited to: tetrahydrofuran, 2-methyltetrahydrofuran, 1,3-dioxolane, 2-methyl-1,3-dioxolane, 4-methyl-1,3-dioxolane, 1,3-dioxane, 1,4-dioxane and dimethoxypropane. In some embodiments, the chain ether according to the present application includes, but is not limited to: dimethoxymethane, 1,1-dimethoxyethane, 1,2-dimethoxyethane, diethoxymethane, 1,1-diethoxyethane, 1,2-di ethoxyethane, ethoxymethoxymethane, 1,1-ethoxymethoxyethane and 1,2-ethoxymethoxyethane.

In some embodiments, the phosphorus-containing organic solvent according to the present application includes, but is not limited to: trimethyl phosphate, triethyl phosphate, dimethyl ethyl phosphate, methyl diethyl phosphate, ethylene methyl phosphate, ethylene ethyl phosphate, triphenyl phosphate, trimethyl phosphite, triethyl phosphite, triphenyl phosphite, tris(2,2,2-trifluoroethyl) phosphate and tris(2,2,3,3,3-pentafluoropropyl) phosphate.

In some embodiments, the sulfur-containing organic solvent according to the present application includes, but is not limited to: sulfolane, 2-methylsulfolane, 3-methylsulfolane, dimethyl sulfone, diethyl sulfone, ethyl methyl sulfone, methyl propyl sulfone, dimethyl sulfoxide, methyl methanesulfonate, ethyl methanesulfonate, methyl ethanesulfonate, ethyl ethanesulfonate, dimethyl sulfate, diethyl sulfate and dibutyl sulfate, as well as a sulfur-containing organic solvent some hydrogen atoms of which are substituted with fluorine.

In some embodiments, the aromatic fluorine-containing organic solvent according to the present application includes, but is not limited to: fluorobenzene, difluorobenzene, trifluorobenzene, tetrafluorobenzene, pentafluorobenzene, hexafluorobenzene, and trifluoromethylbenzene.

In some embodiments, the non-aqueous solvent of the present application may be used alone, or in combination of two or more thereof:

II. Electrochemical Device

The electrochemical device of the present invention includes any device in which an electrochemical reaction takes place, and specific examples include all kinds of primary batteries, secondary batteries, fuel cells, solar cells, or capacitors. In particular, the electrochemical device is a lithium secondary battery including a lithium metal secondary battery, a lithium ion secondary battery, a lithium polymer secondary battery or a lithium ion polymer secondary battery. In some embodiments, the electrochemical device of the present application is an electrochemical device having a cathode having a cathode active material capable of absorbing and releasing metal ions; an anode having a anode active material capable of absorbing and releasing metal ions, and characterized by comprising any of the electrolytes of the present application.

Electrolyte

The electrolyte used in the electrochemical device of the present application is any of the aforementioned electrolytes according to the present application. Moreover, the electrolyte used in the electrochemical device of the present application may include other electrolytes falling within the scope of present application.

Anode

The anode material used in the electrochemical device according to the embodiments of the present application can be prepared using materials, construction and manufacturing methods well known in the art. For example, the anode of the present application can be prepared using the technique described in U.S. Pat. No. 9,812,739B, the entire contents of which are incorporated herein by reference.

In some embodiments, the anode active material is any substance capable of electrochemically absorbing and releasing a metal ion such as lithium ion. In some embodiments, the anode active material includes a carbonaceous material, a silicon-carbon material, an alloy material or a lithium-containing metal composite oxide material. In some embodiments, the anode active material includes one or more of those described above.

In some embodiments, the anode can be formed by adding a binder and a solvent to, and if necessary, adding a thickener, a conductive material, a filler, or the like the anode active material, to prepare a slurry, coating the slurry to a current collector, drying, and then pressing.

In some embodiments, when the anode includes an alloy-based material, a thin film layer (anode active material layer) as an anode active material can be formed by vapor deposition, sputtering, or plating.

In some embodiments, when the anode includes lithium metal, an anode active material layer is formed from, for example, a conductive skeleton of twisted spherical shape and metal particles dispersed in the conductive skeleton, wherein the conductive skeleton of twisted spherical shape may have a porosity of about 5% to about 85%, and a protective layer may be further disposed on the anode active material layer of lithium metal.

Cathode

The cathode material used in the electrochemical device of the present application can be prepared using materials, construction and manufacturing methods well known in the art. In some embodiments, the cathode of the present application can be prepared using the technique described in U.S. Pat. No. 9,812,739B, the entire contents of which are incorporated herein by reference.

In some embodiments, the cathode active material includes, but is not limited to: a sulfide, a phosphate salt compound and a lithium-transition metal composite oxide. In some embodiments, the cathode active material includes a lithium-transition metal compound which has a structure capable of removing and intercalating lithium ions. In some embodiments, the composition of the lithium-transition metal compound can refer to the technical content described in U.S. Pat. No. 9,812,739B.

In some embodiments, the cathode is prepared by forming a cathode material from a cathode active material layer including a lithium-transition metal compound powder and a binder on a current collector.

In some embodiments, the cathode active material layer can generally be produced by: dry mixing a cathode material and a binder (and a conductive material and a thickener, if necessary) to form flakes, pressing the obtained flakes on a cathode current collector or dissolving or dispersing the material in a liquid medium to form a slurry, coating the slurry on a cathode current collector, and drying. In some embodiments, the material of the cathode active material layer includes any material known in the art. In some embodiments, the cathode active material layer includes materials described in U.S. Pat. No. 9,812,739B.

Electrode Compaction Density

The electrochemical device of the present application comprises a cathode and an anode, a separator and an electrolyte. The electrode includes a current collector and a coating on the current collector. The coating includes a single-sided coating, a double-sided coating, or a combination thereof. The single-sided coating is a coating formed by applying a slurry on one surface of the current collector. The double-sided coating is a coating formed by applying a slurry on two opposite surfaces of the current collector.

Figure 2:
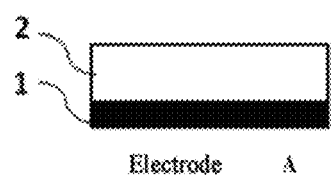
FIG. 2 is a view schematically showing the structure of an electrode A with a single-sided coating of the present application.

In some embodiments, as shown in FIG. 2, an electrode A includes a current collector 1 and a coating 2 on the current collector 1. As shown in FIG. 2, the coating 2 is only present on one surface of the current collector, and such coating is a single-sided coating.

Figure 3:
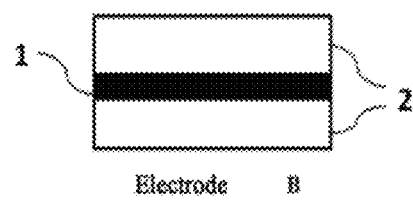
FIG. 3 is a view schematically showing the structure of an electrode B with a double-sided coating of the present application.

In some embodiments, as shown in FIG. 3, an electrode B includes a current collector 1 and a coating 2 on the current collector. As shown in FIG. 3, the coating 2 is present on two opposite surfaces of the current collector, and such coating is a double-sided coating.

Figure 4:
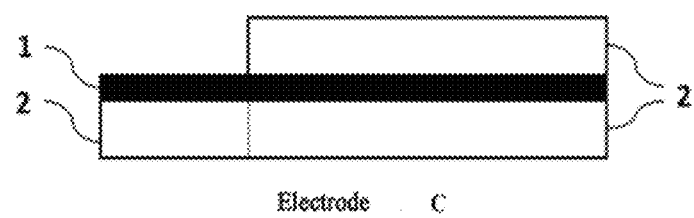
FIG. 4 is a view schematically showing the structure of an electrode C with a single-sided coating and a double-sided coating of the present application.

In some embodiments, as shown by an electrode C in FIG. 4, one surface of a portion of a current collector 1 is coated with a slurry to form a coating 2 and the two opposite surfaces of the other portion of the current collector 1 are coated with a slurry to form a coating 2. Such coating includes both a single-sided coating and a double-sided coating.

In a wound electrochemical device, the cathode and the anode are usually each formed by winding an elongated electrode, so that both a single-sided coating and a double-sided coating are present on the elongated electrode. In a laminated electrochemical device, the cathode and the anode are usually formed by laminating-shaped electrode s, and there is only a single-sided coating or a double-sided coating on the same electrode. In an electrochemical device in which the wound and laminated electrode s are assembled in combination, the cathode and anode generally comprise an elongated electrode having both a single-sided coating and a double-sided coating, and a -shaped electrode having only a single-sided coating or a double-sided coating.

The electrode has an electrode compaction density. The electrode compaction density is obtained by: measuring the thickness of an electrode using a precise measurement tool, such as a ten-thousandths micrometer; then taking the electrode of a certain area and accurately measuring the area and weight; and calculating the electrode compaction density by a formula below:

Electrode compaction density=(Weight of electrode−Weight of current collector)/Area of electrode/(Thickness of electrode−Thickness of current collector)

A lower compaction density makes the porosity higher, making some of the particles in an insulating state, and unable to participate in charge and discharge, thereby resulting in a low specific discharge capacity, thus affecting the performance of the electrochemical device. A too high compaction density may cause difficulty in infiltrability of the electrolyte and decrease in solution retention, such that the cycle and rate performances cannot be guaranteed. Properly controlling the electrodecompaction density of the single-sided and double-sided coating is important to obtain electrochemical devices with high capacity density, and excellent cycle and storage performances.

In some embodiments, the electrode with a single-sided coating has an electrode compaction density D1, and an electrode with a double-sided coating has an electrode compaction density D2, and D1 and D2 meet the relationship: about $0.8 \leq D1/D2 \leq$ about 1.2, under this circumstance, the effects of the cathode and anode active materials are well exerted, so that the electrode can obtain good electrical conductivity, which is also important to control the expansion of electrochemical devices. Therefore, the obtained electrochemical device has high capacity density and excellent cycle and storage performances.

In some embodiments, D1 and D2 meet the relationship: about $0.9 \leq D1/D2 \leq$ about 1.1. Under this circumstance, the performance of the electrochemical device can be further improved.

In some embodiments, D1 and D2 meet the relationship: about $0.9 \leq D1/D2 \leq$ about 1.1.

In some embodiments, D1 and D2 meet the relationship: about $0.95 \leq D1/D2 \leq$ about 1.05. Under this circumstance, the distributions of pores and pore sizes in the single-sided coating and the double-sided coating are more uniform, the distributions of the conductive agent and the binder are more uniform, the contact resistance and charge exchange resistance of the electrode are lowered, and the active area capable of participating in the reaction is increased, thereby significantly improving the electrochemical performance of the material and further improving the performances of the electrochemical device.

In some embodiments, the electrode may be a cathode or an anode. When the electrode is a cathode, about 3.5 g/cm³$\leq D2 \leq$about 4.3 g/cm³. When D2 is within this range, the cathode can have good electrical conductivity, and the effect of the cathode active material can be well exerted. When the electrode is an anode, about 1.2 g/cm³$\leq D2 \leq$about 1.8 g/cm³. When D2 is within this range, the anode can have a higher breaking strength, thereby preventing the electrode particles from falling off during the cycle.

Separator

In some embodiments, the electrochemical device of the present application is provided with a separator between the positive electrode and the negative electrode to prevent short circuit. The material and shape of the separator used in the electrochemical device of the present application are not particularly limited, and may be any of the techniques disclosed in the prior art. In some embodiments, the separator includes a polymer or an inorganic substance or the like formed from a material which is stable to the electrolyte of the present application.

For example, the separator may include a substrate layer and a surface treatment layer. The substrate layer is a non-woven fabric, film, or composite film having a porous structure, and the material of the substrate layer is at least one selected from polyethylene, polypropylene, polyethylene terephthalate, and polyimide. Particularly, a porous polypropylene film, a porous polyethylene film, a polypropylene nonwoven fabric, a polyethylene nonwoven fabric, or a porous polypropylene-polyethylene-polypropylene composite film may be used.

At least one surface of the substrate layer is provided with a surface treatment layer, which may be a polymer layer or an inorganic layer, or a layer formed by mixing a polymer and an inorganic substance.

The inorganic layer comprises inorganic particles and a binder. The inorganic particles are one or more selected from alumina, silica, magnesia, titanium oxide, hafnium dioxide, tin oxide, cerium dioxide, nickel oxide, zinc oxide, calcium oxide, zirconia, yttria, silicon carbide, boehmite, aluminum hydroxide, magnesium hydroxide, calcium hydroxide and barium sulfate. The binder is one or more selected from polyvinylidene fluoride, a copolymer of vinylidene fluoride-hexafluoropropylene, a polyamide, polyacrylonitrile, a polyacrylate ester, polyacrylic acid, a polyacrylate salt, polyvinylpyrrolidone, polyvinyl ether, polymethyl methacrylate, polytetrafluoroethylene, and polyhexafluoropropylene. The polymer layer contains a polymer, and the material of the polymer includes at least one of a polyamide, polyacrylonitrile, a polyacrylate ester, polyacrylic acid, a polyacrylate salt, polyvinylpyrrolidone, polyvinyl ether, polyvinylidene fluoride or poly(vinylidene fluoride-hexafluoropropylene).

III. Application

At a high voltage, the oxidizability of the cathode material is increased, and the stability is lowered, which makes the electrolyte easily decompose on the surface of the positive electrode or results in deterioration of the materials of the electrochemical device, so that the capacity of the electrochemical device is decreased. Prior to the present application, the primary solution is to add a film-forming additive to the electrolyte. However, doing so will cause an increase in the DC internal resistance of the battery, thereby resulting in a decrease in the cycle performance and a decrease in the capacity retention rate.

The electrolyte according to the embodiments of the present application can be used to inhibit the increase in DC internal resistance of an electrochemical device, and thus applicable to an electronic device comprising the electrochemical device.

The use of the electrochemical device according to the present application is not particularly limited, and can be used in various known applications, such as notebook computers, pen-input computers, mobile computers, e-book players, portable phones, portable fax machines, portable copiers, portable printers, head-mounted stereo headphones, video recorders, LCD TVs, portable cleaners, portable CD players, Mini discs, transceivers, electronic notebooks, calculators, memory cards, portable recorders, radios, backup power sources, motors, vehicles, motorcycles, motorbicycle, bicycles, lighting apparatus, toys, game consoles, clocks, electric tools, flashing light, cameras, large batteries for household use, or lithium ion capacitors.

Examples

Hereinafter, the present application will be specifically described by way of examples and comparative examples; however, the present application is not limited thereto as long as they do not deviate from the spirit of the present application.

1. Preparation of Lithium-Ion Battery (1) Preparation of an Anode

Graphite, conductive carbon black (Super-P), styrene-butadiene rubber, and sodium carboxymethyl cellulose (CMC) were mixed at a weight ratio of about 95:2:2:1 in deionized water as a solvent, and stirred uniformly, to obtain an anode slurry. The slurry was coated on a copper foil having a thickness of about 12 μm, dried, cold pressed, and cut, and then a tab was welded, to obtain an anode.

(2) Preparation of a Cathode

Lithium cobalt oxide ($LiCoO_2$), conductive carbon black (Super-P), and polyvinylidene fluoride (PVDF) were mixed at a weight ratio of about 95:2:3 in N-methylpyrrolidone as a solvent, and stirred uniformly, to obtain a cathode slurry. The slurry was coated on an aluminum foil having a thickness of about 12 μm, dried, cold pressed, and cut, and then a tab was welded, to obtain a cathode.

(3) Preparation of an Electrolyte:

Under a dry argon atmosphere, EC, PC, and DEC (at a weight ratio of about 1:1:1) were mixed, and then $LiPF_6$ was added and mixed uniformly, to form a basic electrolyte, in which the concentration of $LiPF_6$ is 1.15 mol/L. Different amounts of substances shown in Tables 1-1 to 9 were added to the basic electrolyte to obtain the electrolytes of different examples and comparative examples, wherein the contents of each substance in the electrolyte described below were obtained based on the total weight of the electrolyte.

(4) Preparation of a Separator

A porous PE polymer film was used as a separator.

(5) Preparation of Lithium-Ion Battery

The obtained cathode, anode and separator were wound in sequence and placed in the outer packaging foil, with a liquid injection port being left. The electrolyte was injected via the liquid injection port, encapsulated, formed and capacity graded to obtain a lithium ion battery. The fresh battery herein refers to a battery which is obtained through aforementioned preparation process and is ready for shipping.

2. Test Methods of Battery Performance (1) Test Method for Change in DC Internal Resistance at 20% SOC At 25° C., the battery was charged to 4.45 V at a constant current of 1 C (nominal capacity) and then charged to a current of ≤0.05 C at a constant voltage of 4.45 V, allowed to stand for 5 min, and discharged to a cut-off voltage of 3 V at a constant current of 1 C. The actual discharge capacity was recorded. The battery was adjusted to 50% of the full charge capacity required with the actual capacity, continuously discharged for 10 s at a current of 0.3 C. The DC internal resistances (DCIRs) (average of the measurements from 15 batteries) after one cycle, 200 cycles and 400 cycles was obtained by dividing the current with the difference between the voltage before discharge and the voltage at the end of discharge.

(2) Test Method for Storage Performance at High Temperature of 60° C.

The battery was allowed to stand at 25° C. for 30 minutes, charged to 4.45 V at a constant current of 0.5 C and then charged to 0.05 C at a constant voltage of 4.45 V, allowed to stand for 5 minutes, and then stored at 60° ° C. for 21 days. The thickness expansion rate of the battery was measured and calculated by a formula below:

Thickness expansion rate=[(Thickness after storage−Thickness before storage)/Thickness before storage]×100%

(3) Test Method for Battery Capacity Retention Rate

At 45° C., the battery was charged to 4.45 V at a constant current of 1 C and then charged to a current of 0.05 C at a constant voltage, and discharged to 3.0 V at a constant current of 1 C, the above being the first cycle. Multiple cycles were performed on the battery under the above conditions. The capacity retention rate of the fresh battery and the battery after 200 cycles and 400 cycles was calculated respectively. The capacity retention rate after cycles is calculated by a formula below:

Capacity retention rate after the cycle=(Discharge capacity after corresponding cycles/Discharge capacity after the first cycle)×100%

(4) Test Method for Voltage Drop

At 25° C., the battery was charged to 4.45 V at a constant current of 1 C and then charged to a current of 0.05 C at a constant voltage, discharged to 3.2 V at a constant current of 1 C, and allowed to stand for 5 minutes. Then the voltage was tested, and after 24 h's storage at 85° C., the voltage was tested again. Voltage drop=Voltage before storage−Voltage after storage.

(5) Intermittent Cycle Test Method

At 50° C., the lithium ion battery was charged to 4.45 V at a constant voltage of 0.5 C and then to a cut-off current of 0.05 C at a constant current, allowed to stand for 20 h, and then discharged to 3.0 V at a constant current of 0.5 C. Repeating charge/discharge as above, the capacity retention rate of the fresh battery, and the battery after 30, 50, and 100 cycles was calculated respectively. Capacity retention rate after cycles=(Discharge capacity after corresponding cycles/Discharge capacity of the first cycle)×100%

3. Test Results

The abbreviations for the chemical materials used in the examples of present application are shown in the following two tables:

| Material | Abbreviation | Material Name | Abbreviation |
|---|---|---|---|
| Ethylene carbonate | EC | 1,3-propanesultone | PS |
| Propylene carbonate | PC | Ethylene sulfate | DTD |
| Ethyl methyl carbonate | EMC | Butanedinitrile | SN |
| Dimethyl carbonate | DMC | Adiponitrile | ADN |
| | | 1,4-dicyano-2-butene | DCB |
| Diethyl carbonate | DEC | 1,3,6-Hexanetricarbonitrile | HTCN-1 |
| γ-butyrolactone | GBL | 1,2,6- Hexanetricarbonitrile | HTCN-2 |
| γ-valerolactone | VL | 1,3,5-Pentanetricarbonitrile | PTCN |
| Ethyl propionate | EP | Ethylene glycol bis(2-cyanoethyl) ether | EDN |
| Propyl propionate | PP | 1,1-difluoro-2,2-difluoroethyl-2',2'difluoro-3',3'-difluoropropyl ether | FEPE |

-continued

| Material | Abbreviation | Material Name | Abbreviation |
|---|---|---|---|
| | | 2-trifluoromethyl-3-methoxyperfluoropentane | TMMP |
| | | 2-(trifluoro-2-fluoro-3-difluoro)-3-difluoro-4-fluoro-5-trifluoropentane | TPTP |
| Vinylene carbonate | VC | 1-Propylphosphonic cyclic anhydride | T3P |
| Fluoroethylene carbonate | FEC | 1-Methylphosphonic cyclic anhydride | TM3P |
| | | 1-Ethylphosphonic cyclic anhydride | TE3P |
| | | 1,2,3-tris(2-cyanoethoxy)propane | TCEP |

| | | |
|---|---|---|
| Dinitrile compound | A | $A_1$: SN; $A_2$: ADN; $A_3$: EDN; $A_4$: DCB |
| Trinitrile compound | B | $B_1$: HTCN-1; $B_2$: HTCN-2; $B_3$: PTCN; $B_4$: TCEP |
| Propyl propionate (PP) | C | |
| Fluoroether | D | $D_1$: FEPE; $D_2$: TMMP; $D_3$: TPTP |
| Cyclic phosphonic anhydride | E | $E_1$: T3P $E_2$: TM3P; $E_3$: TE3P |
| Other additives | F | $F_1$: VC; $F_2$: PS; $F_3$: DTD |
| Cyclic carboxylate ester | H | $H_1$: GBL; $H_2$: VL |
| Single- and double-side compaction density | G | |

(1) Different amounts of a compound comprising two cyano groups, a compound comprising three cyano groups and/or propyl propionate as shown in Tables 1-1 and 1-2 were added to the basic electrolyte. The electrolyte was injected into a battery prepared according to the above method. The DC internal resistance at 20% SOC of the batteries was tested. The test results are shown in Tables 1-1 and 1-2.

TABLE 1-1

| | $A_1$ (X wt %) | $B_1$ (Y wt %) | C (Z wt %) | X + Y | X/Y | DC internal resistance (mΩ) at 20% SOC | | |
|---|---|---|---|---|---|---|---|---|
| | | | | | | Fresh Battery | After 200 cycles | After 400 cycles |
| S1-1 | 4 | 1 | 30 | 5 | 4 | 50.8 | 84.3 | 91.2 |
| S1-2 | 4 | 2 | 30 | 6 | 2 | 54.4 | 88.0 | 98.6 |
| S1-3 | 4 | 3 | 30 | 7 | 1.3 | 55.7 | 88.9 | 99.4 |
| S1-4 | 4 | 0.5 | 30 | 4.5 | 8 | 57.8 | 92.0 | 101.0 |
| S1-5 | 3 | 0.5 | 30 | 3.5 | 6 | 57.1 | 91.2 | 93.5 |
| S1-6 | 4 | 0.4 | 30 | 4.2 | 10 | 55.9 | 99.4 | 112.8 |
| S1-7 | 3 | 2 | 30 | 5 | 1.5 | 52.3 | 84.4 | 91.5 |
| S1-8 | 2 | 2 | 30 | 4 | 1 | 51.9 | 84.2 | 91.4 |
| S1-9 | 1 | 2 | 30 | 3 | 0.5 | 52.3 | 86.5 | 92.4 |
| S1-10 | 0.5 | 2 | 30 | 2.5 | 0.25 | 54.8 | 79.4 | 102.5 |
| S1-11 | 0.2 | 2 | 30 | 2.2 | 0.1 | 59.2 | 91.8 | 105.3 |
| S1-12 | 1 | 5 | 30 | 6 | 0.2 | 58.5 | 97.0 | 104.1 |
| S1-13 | 7 | 3 | 30 | 10 | 2.3 | 60.4 | 92.9 | 107.3 |
| D1-1 | 0 | 0 | 0 | 0 | 0 | 63.8 | 140.9 | 190.4 |
| D1-2 | 0 | 1 | 0 | 1 | 0 | 62.3 | 138.5 | 188.2 |
| D1-3 | 4 | 0 | 0 | 4 | 0 | 61.8 | 136.5 | 184.2 |
| D1-4 | 0.1 | 1 | 0 | 1.1 | 0.1 | 63.8 | 120.9 | 126.4 |
| D1-5 | 4 | 0.1 | 0 | 4.1 | 40 | 68.3 | 109.8 | 124.9 |
| D1-6 | 7 | 5 | 0 | 12 | 1.4 | 69.2 | 112.3 | 133.0 |
| D1-7 | 1 | 11 | 0 | 12 | 0.09 | 63.8 | 100.9 | 139.3 |
| D1-8 | 11 | 1 | 0 | 12 | 10 | 72.0 | 116.3 | 135.4 |

TABLE 1-2

| | A (X wt %) | B (Y wt %) | C (Z wt %) | X + Y | X/Y | DC internal resistance (mΩ) at 20% SOC | | |
|---|---|---|---|---|---|---|---|---|
| | | | | | | Fresh Battery | After 200 cycles | After 400 cycles |
| S1-14 | $A_2$(4) | $B_2$(3) | 30 | 7 | 1.3 | 55.5 | 88.1 | 98.7 |
| S1-15 | $A_2$(4) | $B_2$(0.5) | 30 | 4.5 | 8 | 57.2 | 91.6 | 100.6 |
| S1-16 | $A_2$(3) | $B_2$(0.5) | 30 | 3.5 | 6 | 55.9 | 89.4 | 98.8 |
| S1-17 | $A_3$(3) | $B_3$(2) | 30 | 5 | 1.5 | 51.1 | 82.6 | 90.7 |
| S1-18 | $A_3$(2) | $B_3$(2) | 30 | 4 | 1 | 51.2 | 83.3 | 90.5 |
| S1-19 | $A_3$(1) | $B_3$(2) | 30 | 3 | 0.5 | 51.3 | 85.1 | 91.1 |
| S1-20 | $A_3$(0.5) | $B_4$(2) | 30 | 2.5 | 0.25 | 54.3 | 79.1 | 90.1 |
| S1-21 | $A_2$(0.2) | $B_2$(2) | 30 | 2.2 | 0.1 | 58.5 | 91.2 | 104.8 |
| S1-22 | $A_2$(1) | $B_2$(5) | 30 | 6 | 0.2 | 58.1 | 96.5 | 103.3 |
| S1-23 | $A_2$(7) | $B_2$(3) | 30 | 10 | 2.3 | 60.2 | 92.3 | 106.5 |
| S1-24 | $A_4$(2) | $B_3$(2) | 30 | 4 | 1 | 57.9 | 86.1 | 93.4 |

As shown in Table 1-1, in Comparative Examples D1-1 to D1-8, butanedinitrile or 1,3,6-hexanetricarbonitrile was added alone, and no propyl propionate was added. The DC internal resistance of the battery was significantly increased after cycles.

When butanedinitrile, 1,3,6-hexanetricarbonitrile and propyl propionate were used in Examples S1-1 to S1-13 simultaneously, the increase in DC internal resistance of the battery after cycles was obviously inhibited.

When the propyl propionate content is kept unchanged, and the relation between the butanedinitrile content X and the 1,3,6-hexanetricarbonitrile content Y is adjusted, it is found that when X and Y meet the conditions represented by both Formula (1) and Formula (2): {about 2 wt %≤(X+Y) ≤about 11 wt % . . . (1); and about 0.1≤(X/Y)≤about 8 . . . (2)}, the inhibition effect on the increase in DC internal resistance of the battery after cycles is remarkable. When X and Y meet about 2 wt %≤(X+Y)≤about 8 wt % and about 0.1≤(X/Y)≤about 6, the combination of the additives can exhibit synergistic effect and can sufficiently suppress the increase in DC internal resistance.

Figure 1B:
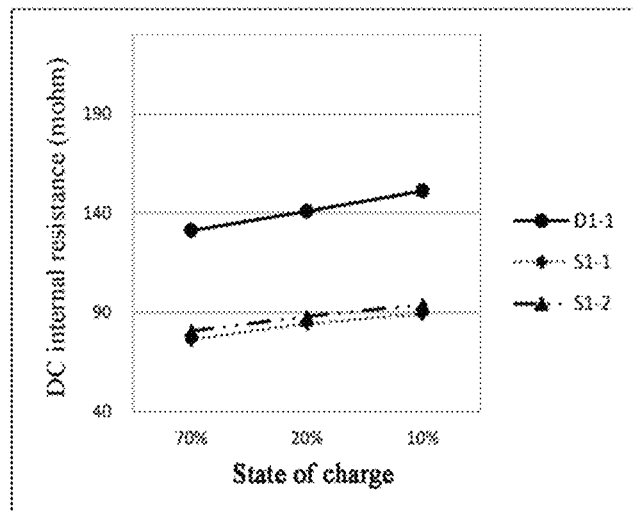
FIG. 1B shows the DC internal resistances of batteries of Examples S1-1 and S1-2 of the present application and Comparative Example D1-1 at different charge states (10% SOC, 20% SOC, and 70% SOC) after 200 cycles of charge and discharge.
Figure 1C:
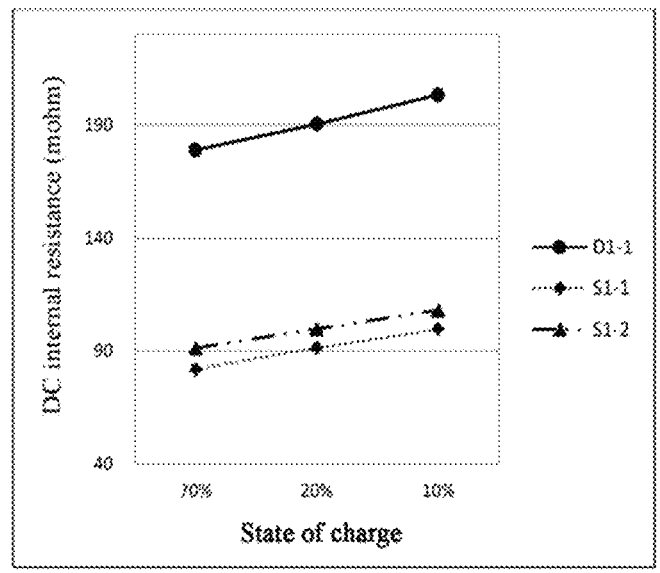
FIG. 1C shows the DC internal resistances of batteries of Examples S1-1 and S1-2 of the present application and Comparative Example D1-1 at different charge states (10% SOC, 20% SOC, and 70% SOC) after 400 cycles of charge and discharge.

FIG. 1A shows the DC internal resistances of fresh batteries of Examples S1-1 and S1-2 of the present application and Comparative Example D1-1 at different charge states (10% SOC, 20% SOC, and 70% SOC). FIG. 1B shows the DC internal resistances of batteries of Examples S1-1 and S1-2 of the present application and Comparative Example D1-1 at different charge states (10% SOC, 20% SOC, and 70% SOC) after 200 cycles of charge and discharge. FIG. 1C shows the DC internal resistances of batteries of Examples S1-1 and S1-2 of the present application and Comparative Example D1-1 at different charge states (10% SOC, 20% SOC, and 70% SOC) after 400 cycles of charge and discharge. It can be seen that the increase in DC internal resistance during cycles in Examples S1-1 and S1-2 is significantly improved compared with Comparative Example D1-1.

As shown in Table 1-2, when the dinitrile compound is adiponitrile or ethylene glycol bis(2-cyanoethyl)ether, and is the trinitrile compound 1,2,6-hexanetricarbonitrile, 1,3,6-Hexanetricarbonitrile, or 1,2,3-tris(2-cyanoethoxy)propane, the effect of inhibiting the increase in DC internal resistance can also be achieved. When the dinitrile compound is ethylene glycol bis(2-cyanoethyl)ether, or the trinitrile compound is 1,2,3-tris(2-cyanoethoxy)propane, the effect of inhibiting the increase in DC internal resistance of the battery after cycles is more significant.

(2) Different amounts of a compound comprising two cyano groups, a compound comprising three cyano groups and/or propyl propionate as shown in Table 2 were added to the basic electrolyte. The electrolyte was injected into a battery prepared according to the above method. The DC internal resistance at 20% SOC of the battery was tested. The test results are shown in Table 2.

TABLE 2

|  | C ($Z$ wt %) | $A_1$ ($X$ wt %) | $B_1$ ($Y$ wt %) | Y/Z | DC internal resistance (mΩ) at 20% SOC | | |
|---|---|---|---|---|---|---|---|
|  |  |  |  |  | Fresh battery | After 200 cycles | After 400 cycles |
| S1-1 | 30 | 4 | 1 | 0.03 | 50.8 | 84.3 | 91.2 |
| S2-1 | 5 | 4 | 1 | 0.2 | 68.7 | 85.2 | 97.6 |
| S2-2 | 10 | 4 | 1 | 0.1 | 60.3 | 83.1 | 95.7 |
| S2-3 | 20 | 4 | 1 | 0.05 | 56.1 | 81.6 | 93.9 |
| S2-4 | 40 | 4 | 1 | 0.025 | 47.5 | 78.2 | 87.2 |
| S2-5 | 50 | 4 | 1 | 0.02 | 56.3 | 82.6 | 98.3 |
| S2-6 | 10 | 4 | 3 | 0.3 | 64.3 | 89.5 | 97.7 |
| S2-7 | 50 | 4 | 0.5 | 0.01 | 53.2 | 84.3 | 94.1 |
| D2-1 | 4 | 4 | 1 | 0.25 | 72.1 | 108.5 | 118.9 |
| D2-2 | 60 | 4 | 1 | 0.017 | 42.0 | 100.1 | 113.9 |
| D2-3 | 10 | 4 | 5 | 0.5 | 62.3 | 85.4 | 111.3 |
| D2-4 | 50 | 4 | 0.1 | 0.0025 | 53.2 | 89.3 | 109.4 |

As shown in Table 2, when the content of propyl propionate is within the range of 5 wt % to 50 wt %, the DC internal resistance of the fresh battery decreases continuously with the propyl propionate content increasing. In addition, when the content of the propyl propionate is less than 5 wt % or greater than 50 wt %, the DC internal resistance of the battery is greatly increased after 200 cycles, and the performance is deteriorated. The combination of additives can form a cathode protection film so as to reduce the side reactions, thereby effectively controlling the polarization and side reactions of the battery. The ratio of the content of the trinitrile compound to the content of propyl propionate has great effect on the change in DC internal resistance of the battery. When Y/Z is within the range of 0.01-0.3, a better inhibition effect on the increase in DC internal resistance is achieved.

(3) To the basic electrolyte, 30 wt % of propyl propionate, 4 wt % of butanedinitrile (A1), 1 wt % of 1,3,6-hexanetricarbonitrile (B1) and a fluoroether of different contents as shown in Table 3 were added. The obtained electrolyte was injected to a battery prepared according to the above method. The DC internal resistance at 20% SOC and the 21-day thickness expansion rate at 60° ° C. were tested. The test results are shown in Table 3.

TABLE 3

| | D (content, wt %) | DC internal resistance (mΩ) of fresh battery at 20% SOC | 21-day thickness expansion rate at 60° C. |
|---|---|---|---|
| S1-1 | 0 | 50.8 | 7.6% |
| S3-1 | $D_1(0.1)$ | 50.2 | 6.2% |
| S3-2 | $D_1(0.5)$ | 49.8 | 6.0% |
| S3-3 | $D_1(1)$ | 48.6 | 5.7% |
| S3-4 | $D_1(1.5)$ | 48.5 | 5.1% |
| S3-5 | $D_1(2)$ | 48.4 | 4.8% |
| S3-6 | $D_1(2.5)$ | 48.3 | 4.9% |
| S3-7 | $D_1(3)$ | 48.1 | 5.6% |
| S3-8 | $D_1(5)$ | 49.3 | 6.8% |
| S3-9 | $D_2(1)$ | 49.2 | 6.1% |
| S3-10 | $D_3(1)$ | 49.4 | 5.7% |
| D3-1 | $D_1(6)$ | 51.3 | 8.5% |

As can be seen from Table 3, with the addition of fluoroether (0.1-5 wt %), the DC internal resistance and the thickness expansion rate of the fresh battery are improved to a certain extent, and the storage performance is slightly decreased when the addition amount is large, but it is still within the desired range. When the fluoroether content is more than 5 wt %, the DC internal resistance and the thickness expansion rate after storage at 60° ° C. of the fresh battery are deteriorated.

(4) To the basic electrolyte, 30 wt % of propyl propionate, 4 wt % of butanedinitrile (A1), 1 wt % of 1,3,6-hexanetricarbonitrile (B1) and a cyclic phosphonic anhydride of different contents as shown in Table 4 were added. The obtained electrolyte was injected to a battery prepared according to the above method. The DC internal resistance at 20% SOC and the capacity retention ratio of the battery were tested. The test results are shown in Table 4.

TABLE 4

| | E (content, wt %) | DC internal resistance (mΩ) at 20% SOC | | | Capacity retention rate | | |
|---|---|---|---|---|---|---|---|
| | | Fresh battery | After 200 cycles | After 400 cycles | Fresh battery | After 200 cycles | After 400 cycles |
| S1-1 | 0 | 50.8 | 84.3 | 91.2 | 100% | 93.5% | 86.3% |
| S4-1 | $E_1(0.1)$ | 48.3 | 51.5 | 88.2 | 100% | 95.7% | 90.1% |
| S4-2 | $E_1(0.5)$ | 45.4 | 48.2 | 82.3 | 100% | 96.3% | 91.4% |
| S4-3 | $E_1(1)$ | 44.6 | 47.1 | 80.5 | 100% | 96.1% | 90.7% |
| S4-4 | $E_1(2)$ | 45.6 | 47.3 | 81.6 | 100% | 95.2% | 89.6% |
| S4-5 | $E_1(3)$ | 45.9 | 49.1 | 89.4 | 100% | 94.7% | 88.5% |
| S4-6 | $E_2(1)$ | 45.2 | 48.3 | 88.3 | 100% | 95.3% | 91.0% |
| S4-7 | $E_3(1)$ | 45.3 | 48.7 | 89.5 | 100% | 95.1% | 90.8% |
| D4-1 | $E_1(4)$ | 46.1 | 58.6 | 105.3 | 100% | 92.1% | 85.3% |

It can be seen from Table 4 that with the addition of cyclic phosphonic anhydride (0.1-3 wt %), the DC internal resistance of the fresh battery and the battery after cycles is improved to a certain extent, which may be attributed to the relatively stable structure of the composite protective film formed by the combined additives; and the cycle performance is improved first and then deteriorated with the addition of the cyclic phosphonic anhydride. When the content is more than 3 wt %, the cycle performance is affected, which may be caused by the decomposition of the cyclic phosphonic anhydride.

(5) To the basic electrolyte, 30 wt % of propyl propionate, 4 wt % of butanedinitrile (A1), 1 wt % of 1,3,6-hexanetrinitrile (B1) and a fluoroether and a cyclic phosphonic anhydride of different contents as shown in Table 5 were added. The obtained electrolyte was injected to a battery prepared according to the above method. The DC internal resistance at 20% SOC, the 21-day thickness expansion rate at 60° C., and the capacity retention rate of the battery were tested. The test results are shown in Table 5.

TABLE 5

| | D₁ (content: wt %) | E₁ (content: wt %) | DC internal resistance (mΩ) at 20% SOC | | | 21-day thickness expansion rate at 60° C. | Capacity retention rate | | |
|---|---|---|---|---|---|---|---|---|---|
| | | | Fresh battery | After 200 cycles | After 400 cycles | | Fresh battery | After 200 cycles | After 400 cycles |
| S1-1 | 0 | 0 | 50.8 | 84.3 | 91.2 | 7.6% | 100% | 93.5% | 86.3% |
| S3-1 | 0.1 | 0 | 50.2 | 83.1 | 90.4 | 6.2% | 100% | 94.2% | 87.9% |
| S4-2 | 0 | 0.5 | 45.4 | 48.2 | 82.3 | 6.7% | 100% | 96.3% | 91.4% |
| S5-1 | 0.1 | 0.5 | 44.7 | 47.2 | 80.8 | 6.0% | 100% | 96.4% | 91.6% |
| S5-2 | 1 | 0.5 | 43.8 | 46.3 | 80.5 | 5.3% | 100% | 96.8% | 91.7% |
| S5-3 | 1 | 0.3 | 44.1 | 48.2 | 79.3 | 4.3% | 100% | 97.1% | 92.3% |
| S5-4 | 1 | 0.1 | 46.3 | 50.5 | 86.2 | 4.5% | 100% | 97.6% | 92.9% |
| S5-5 | 3 | 2 | 43.5 | 47.1 | 81.3 | 4.0% | 100% | 94.8% | 89.4% |

As can be seen from Table 5, with the addition of the fluoroether and the cyclic phosphonic anhydride, the DC internal resistance, the storage performance and the cycle performance of the fresh battery and the battery after cycles are further improved.

(6) To the basic electrolyte, 30 wt % of propyl propionate, 4 wt % of butanedinitrile (A1), 1 wt % of 1,3,6-hexanetricarbonitrile (B1) and other additives of different contents as shown in Table 6 were added. The obtained electrolyte was injected to a battery prepared according to the above method. The voltage drop after storage at 3.2V and 85° C. for 24 h of the battery were tested. The test results are shown in Table 6.

TABLE 6

| | VC (content: wt %) | VEC (content: wt %) | FEC (content: wt %) | PS (content: wt %) | DTD (content: wt %) | Voltage drop after storage at 3.2 V and 85° C. for 24 hrs |
|---|---|---|---|---|---|---|
| S6-1 | 0.5 | — | — | — | — | 0.35 V |
| S6-2 | 0.5 | — | — | 3 | — | 0.32 V |
| S6-3 | 0.5 | — | — | 3 | 0.5 | 0.23 V |
| S6-4 | 1 | — | — | 3 | — | 0.3 V |
| S6-5 | 1 | — | 3 | 3 | — | 0.20 V |
| S6-6 | — | 0.5 | — | 3 | 0.5 | 0.25 V |
| D6-1 | — | — | — | — | — | 0.4 V |

The addition of the film-forming additives VC, VEC, FEC, PS, DTD can further improve the stability of the solid electrolytic interface (SEI) film of the battery. Using a combination of various additives is more conducive to improve the stability of the battery, which is beneficial to the long-term storage of the battery and thus improves the battery reliability.

(7) To the basic electrolyte, 30 wt % of propyl propionate, 4 wt % of butanedinitrile (A1), 1 wt % of 1,3,6-hexanetricarbonitrile (B1) were added. The obtained electrolyte was injected to a battery prepared according to the above method. The electrode compaction density ratio (D1/D2) of the battery was changed according to Table 7, and the capacity retention rate of the battery was tested. The test results are shown in Table 7.

TABLE 7

| | Compaction density ratio (D1/D2) | Capacity retention rate | | |
|---|---|---|---|---|
| | | Fresh battery | After 200 cycles | After 400 cycles |
| S7-1 | 0.8 | 100% | 93.8% | 89.3% |
| S7-2 | 0.9 | 100% | 95.3% | 90.1% |
| S7-3 | 0.95 | 100% | 95.9% | 90.8% |
| S7-4 | 1.0 | 100% | 96.8% | 91.4% |
| S7-5 | 1.05 | 100% | 95.8% | 90.7% |
| S7-6 | 1.1 | 100% | 95.2% | 90.2% |
| S7-7 | 1.2 | 100% | 93.7% | 88.8% |
| D7-1 | 1.3 | 100% | 91.2% | 83.6% |
| D7-1 | 0.7 | 100% | 90.5% | 82.7% |

As can be seen from Table 7, the electrode compaction density ratio (D1/D2) of the lithium ion battery has a significant effect on the cycle performance of the lithium ion battery. A too large or too small D1/D2 will damage the cycle performance of lithium-ion batteries. It can be seen that when D1/D2 is within the range of 0.8-1.2, a better cycle performance is obtained, possibly because the combined additives facilitate the reduction of the electrode interface resistance and the reduction of the cell polarization.

(8) To the basic electrolyte, 30 wt % of propyl propionate, 4 wt % of butanedinitrile (A1), 1 wt % of 1,3,6-hexanetricarbonitrile (B1) and a cyclic phosphonic anhydride of different contents as shown in Table 8 were added. The obtained electrolyte was injected to a battery prepared according to the above method. The electrode compaction density ratio (D1/D2) was changed according to Table 8, and the capacity retention rate of the obtained battery was tested. The test results are shown in Table 8.

TABLE 8

| | D₁ (content:) | E₁ (content:) | G | Capacity retention rate | | |
|---|---|---|---|---|---|---|
| | | | | Fresh battery | After 200 cycles | After 400 cycles |
| S8-1 | 1 | — | 0.8 | 100% | 94.9% | 90.1% |
| S8-2 | 1 | — | 1.0 | 100% | 97.3% | 92.5% |
| S8-3 | 1 | — | 1.2 | 100% | 94.8% | 89.9% |
| S8-4 | — | 0.3 | 0.8 | 100% | 94.3% | 89.6% |
| S85 | — | 0.3 | 1.0 | 100% | 97.9% | 92.2% |
| S8-6 | — | 0.3 | 1.2 | 100% | 95.0% | 90.5% |
| S8-7 | 1 | 0.3 | 1.0 | 100% | 98.1% | 93.3% |

With the addition of the fluoroether or the cyclic phosphonic anhydride, the cycle performance of the lithium ion battery is further improved when the electrode compaction density of the battery is within the range of 0.8-1.2.

(9) To the basic electrolyte, 30 wt % of propyl propionate, 4 wt % of butanedinitrile (A1), 1 wt % of 1,3,6-hexanetricarbonitrile (B1) and a cyclic carboxylate ester of different contents as shown in Table 9 were added. The obtained electrolyte was injected to a battery prepared according to the above method. The capacity retention rate after intermittent cycle of the obtained battery was tested. The test results are shown in Table 9.

TABLE 9

| | H | Capacity retention rate after intermittent cycle | | | |
|---|---|---|---|---|---|
| | (content: wt %) | Fresh battery | After 30 cycles | After 50 cycles | After 100 cycles |
| S1-1 | 0 | 100% | 73.80% | 64.30% | 54.50% |
| S9-1 | $H_1(1)$ | 100% | 82.50% | 74.60% | 64.20% |
| S9-2 | $H_1(10)$ | 100% | 87.20% | 81.40% | 77.20% |
| S9-3 | $H_1(20)$ | 100% | 86.20% | 81.30% | 78.00% |
| S9-4 | $H_1(30)$ | 100% | 88.30% | 83.30% | 79.80% |
| S9-5 | $H_1(40)$ | 100% | 87.50% | 80.60% | 75.20% |
| S9-6 | $H_1(50)$ | 100% | 86.30% | 74.40% | 63.20% |
| S9-7 | $H_1(60)$ | 100% | 85.20% | 71.60% | 57.60% |
| S9-8 | $H_2(1)$ | 100% | 81.80% | 73.20% | 61.80% |
| S9-9 | $H_2(10)$ | 100% | 86.50% | 80.80% | 76.10% |
| S9-10 | $H_2(20)$ | 100% | 85.30% | 81.30% | 77.10% |
| S9-11 | $H_2(30)$ | 100% | 88.10% | 83.00% | 79.30% |
| S9-12 | $H_2(40)$ | 100% | 87.10% | 80.10% | 74.80% |
| S9-13 | $H_2(50)$ | 100% | 85.20% | 73.70% | 61.90% |
| S9-14 | $H_2(60)$ | 100% | 82.20% | 70.10% | 55.90% |

The capacity retention rate after intermittent cycle of the battery increases with the increase of the amount of the cyclic carboxylate ester, possibly because the cyclic carboxylate forms a passivated film on the surface of the cathode. However, when the cyclic carboxylate ester content is close to 40 wt %, the intermittent cycle performance deteriorates to a certain extent, which is mainly caused by a side reaction between $LiPF_6$ and the cyclic carboxylate ester. Therefore, the amount of the cyclic carboxylate ester is preferably moderate and should not be too large.

References throughout the specification to "some embodiments", "partial embodiments", "one embodiment", "another example", "example", "specific example" or "partial examples" mean that at least one embodiment or example of the application includes specific features, structures, materials or characteristics described in the embodiments or examples. Thus, the descriptions appear throughout the specification, such as "in some embodiments", "in an embodiment", "in one embodiment", "in another example", "in an example", "in a particular example" or "for example", are not necessarily the same embodiment or example in the application. Furthermore, the particular features, structures, materials or characteristics herein may be combined in any suitable manner in one or more embodiments or examples.

While the illustrative embodiments have been shown and described, it will be understood by those skilled in the art that the embodiments are not to be construed as limiting the present invention, and modifications, substitutions and changes can be made to the embodiments without departing from the spirit and scope of the present application.

The above-described embodiments of the present invention are intended to be illustrative only. Numerous alternative embodiments may be devised by persons skilled in the art without departing from the scope of the following claims.

The invention claimed is:

1. An electrolyte, comprising a dinitrile compound, a trinitrile compound, and propyl propionate; wherein, based on a total weight of the electrolyte, a weight percentage of the dinitrile compound is X, a weight percentage of the trinitrile compound is Y and a weight percentage of the propyl propionate is Z; wherein, $$\text{about } 2.2 \ wt\% \leq (X+Y) \leq \text{about } 8 \ wt\%,$$

$$\text{about } 0.1 \leq (X/Y) \leq \text{about } 6,$$

$$\text{about } 1 \ wt\% < Y < \text{about } 5 \ wt\%,$$

$$\text{about } 30 \ wt\% \leq Z \leq \text{about } 50 \ wt\%, \text{ and}$$

$$\text{about } 0.02 < (Y/Z) \leq \text{about } 0.3;$$

wherein the dinitrile compound is one selected from the group consisting of glutaronitrile, adiponitrile, 1,5-dicyanopentane, 1,6-dicyanohexane, 1,7-dicyanoheptane, 1,8-dicyanooctane, 1,9-dicyanononane, 1,10-dicyanodecane, 1,12-dicyanododecane, tetramethylbutanedinitrile, 2-methylglutaronitrile, 2,4-dimethylglutaronitrile, 2,2,4,4-tetramethylglutaronitrile, 1,4-dicyanopentane, 2,6-dicyanoheptane, 2,7-dicyanooctane, 2,8-dicyanononane, 1,6-dicyanodecane, 1,2-dicyanobenzene, 1,3-dicyanobenzene, 1,4-dicyanobenzene, 3,5-dioxa-pimelonitrile, 1,4-bis(cyanoethoxy)butane, ethylene glycol bis(2-cyanoethyl)ether, diethylene glycol bis(2-cyanoethyl)ether, triethylene glycol bis(2-cyanoethyl)ether, tetraethylene glycol bis(2-cyanoethyl)ether, 3,6,9,12,15,18-hexaoxaeicosanoic dinitrile, 1,3-bis(2-cyanoethoxy)propane, 1,4-bis(2-cyanoethoxy)butane, 1,5-bis(2-cyanoethoxy)pentane, ethylene glycol bis(4-cyanobutyl)ether, 1,4-dicyano-2-butene, 1,4-dicyano-2-methyl-2-butene, 1,4-dicyano-2-ethyl-2-butene, 1,4-dicyano-2,3-dimethyl-2-butene, 1,4-dicyano-2,3-diethyl-2-butene, 1,6-dicyano-3-hexene, 1,6-dicyano-2-methyl-3-hexene, 1,6-dicyano-2-methyl-5-methyl-3-hexene, and any combination thereof;

wherein the trinitrile compound is one selected from the group consisting of: 1,3,5-pentanetricarbonitrile; 1,2,3-propanetrinitrile; 1,2,6-hexanetricarbonitrile; 1,3,6-hexanetricarbonitrile; 1,2,3-tris(2-cyanoethoxy)propane; 1,2,4-tris(2-cyanoethoxy)butane; 1,1,1-tris(cyanoethoxymethylene)ethane; 1,1,1-tris(cyanoethoxymethylene)propane; 3-methyl-1,3,5-tris(cyanoethoxy)pentane; 1,2,7-tris(cyanoethoxy)heptane; 1,2,6-tris(cyanoethoxy)hexane; 1,2,5-tris(cyanoethoxy)pentane; and any combination thereof.

2. The electrolyte according to claim 1, wherein the dinitrile compound comprises ethylene glycol bis(2-cyanoethyl) ether; based on the total weight of the electrolyte, a content of the ethylene glycol bis(2-cyanoethyl) ether is greater than 0.01 wt %, and less than 0.5 wt %.

3. The electrolyte according to claim 1, wherein the dinitrile compound comprises ethylene glycol bis(2-cyanoethyl) ether; based on the total weight of the electrolyte, a content of the ethylene glycol bis(2-cyanoethyl) ether is M; wherein, about $2M < Y \le$ about $4M$.

4. The electrolyte according to claim 1, wherein the dinitrile compound comprises adiponitrile; based on the total weight of the electrolyte, a content of the adiponitrile is greater than 2 wt %, and less than 6 wt %.

5. The electrolyte according to claim 1, wherein the electrolyte satisfies at least one of the following conditions:
(1) the electrolyte further comprises a compound having a sulfur-oxygen double bond, wherein the compound having a sulfur-oxygen double bond comprises 1,3-propanesultone; based on the total weight of the electrolyte, a content of the 1,3-propanesultone is greater than 0.1 wt %, and less than 3 wt %;
(2) the electrolyte further comprises fluorinated cyclic carbonate ester, wherein the fluorinated cyclic carbonate ester comprises fluoroethylene carbonate; based on the total weight of the electrolyte, a content of the fluoroethylene carbonate is greater than 0.1 wt %, and less than 4 wt %;
(3) the electrolyte further comprises a compound having a sulfur-oxygen double bond, wherein the compound having a sulfur-oxygen double bond comprises ethylene sulfate; based on the total weight of the electrolyte, a content of the ethylene sulfate is greater than 0.5 wt %, and less than 2 wt %; or
(4) the electrolyte further comprises a compound having a sulfur-oxygen double bond, wherein the compound having a sulfur-oxygen double bond comprises ethylene sulfate; based on the total weight of the electrolyte, a content of the ethylene sulfate is greater than 0.01 wt %, and less than 0.5 wt %.

6. The electrolyte according to claim 1, wherein the dinitrile compound comprises a compound of Formula (4) or (5):

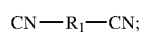
(4)

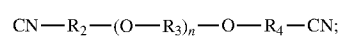
(5)

or a combination thereof,
where $R_1$, $R_2$, $R_3$ and $R_4$ are each independently an alkylene group having 1-5 carbon atoms or an alkenylene group having 2-5 carbon atoms, and n represents an integer from 0 to 5.

7. The electrolyte according to claim 1, wherein about 0.01 wt %$\le$X$\le$about 10 wt % or about 30 wt %$\le$Z$\le$about 45 wt %.

8. The electrolyte according to claim 1, wherein the trinitrile compound comprises a compound of Formula (6) or (7):

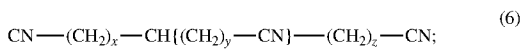
(6)

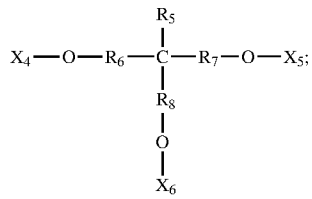
(7)

or a combination thereof,
where in Formula (6), x, y, and z represent an integer from 0 to 5, and x, y, and z are not 0 at the same time; and in Formula (7), $R_5$ represents hydrogen or an alkyl group having 1-5 carbon atoms, $R_6$, $R_7$ and $R_8$ are each independently an alkylene group having 1-5 carbon atoms, and $X_4$, $X_5$ and $X_6$ are each independently —$R_9$—CN, in which $R_9$ represents an alkylene group having 1-5 carbon atoms.

9. The electrolyte according to claim 1, wherein about 0.1$\le$(X/Y)$\le$about 2.3 or about 40 wt %$\le$Z$\le$about 50 wt %.

10. The electrolyte according to claim 1, wherein about 1.5<(X/Y)$\le$about 2.3.

11. The electrolyte according to claim 1, wherein about 3.5 wt %<(X+Y)<about 8 wt %, and about 0.1$\le$(X/Y)$\le$about 2.3.

12. The electrolyte according to claim 1, wherein about 3.5 wt %<(X+Y)<about 8 wt %, and about 1.5<(X/Y)$\le$about 2.3.

13. The electrolyte according to claim 1, further comprising a fluoroether comprising at least one of the compounds of Formula (8), Formula (9), Formula (10) or Formula (11):

(8)

(9)

(10)

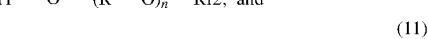
(11)

wherein Formulae (8), (9), (10), and (11), Rf1 and Rf2 are each independently a linear or branched $C_1$ to $C_{12}$ fluoroalkyl group having at least one hydrogen atom substituted with fluoro, R is a linear or branched $C_1$ to $C_{12}$ alkyl group, and R' is a linear or branched $C_1$ to $C_5$ alkylene group, and n is an integer from 1 to 5.

14. The electrolyte according to claim 13, wherein Rf1 or Rf2 is each independently a fluoroalkyl group selected from the group consisting of HCF$_2$—, CF$_3$—, HCF$_2$CF$_2$—, CH$_3$CF$_2$—, CF$_3$CH$_2$—, CF$_3$CF$_2$—, (CF$_3$)$_2$CH—, HCF$_2$CF$_2$CH$_2$—, CF$_3$CH$_2$CH$_2$—, HCF$_2$CF$_2$CF$_2$CH$_2$—, HCF$_2$CF$_2$CF$_2$CF$_2$CH$_2$—, CF$_3$CF$_2$CH$_2$—, CF$_3$CFHCF$_2$CH$_2$—, HCF$_2$CF(CF$_3$)CH$_2$—, and CF$_3$CF$_2$CH$_2$CH$_2$—.

15. The electrolyte according to claim 13, wherein the fluoroether is one selected from the group consisting of: HCF$_2$CF$_2$CH$_2$OCF$_2$CF$_2$H, (CF$_3$)$_2$CFCF(CF$_2$CF$_3$)(OCH$_3$), CF$_3$CHFCF$_2$CH(CH$_3$)OCF$_2$CHFCF$_3$, HCF$_2$CF$_2$CH$_2$OCF$_2$CF$_2$CF$_2$H, HCF$_2$CF$_2$OCH$_2$CF$_3$, HCF$_2$CF$_2$OCH$_2$CH$_2$OCF$_2$CF$_2$H, HCF$_2$CF$_2$OCH$_2$CH$_2$CH$_2$OCF$_2$CF$_2$H, HCF$_2$CF$_2$CH$_2$OCF$_2$CF$_2$CF$_2$H, HCF$_2$CF$_2$OCH$_2$CH$_2$OCF$_2$CF$_2$CF$_2$H, HCF$_2$CF$_2$OCH$_2$CH$_2$CH$_2$OCF$_2$CF$_2$CF$_2$H, CH$_3$OCH$_2$CH$_2$OCH$_2$CH$_2$F, CH$_3$OCH$_2$CH$_2$OCH$_2$CF$_3$, CH$_3$OCH$_2$CH(CH$_3$)OCH$_2$CH$_2$F, CH$_3$OCH$_2$CH(CH$_3$)OCH$_2$CF$_3$, FCH$_2$CH$_2$OCH$_2$CH$_2$OCH$_2$CH$_2$F, FCH$_2$CH$_2$OCH$_2$CH(CH$_3$)OCH$_2$CH$_2$F, CF$_3$CH$_2$O(CH$_2$CH$_2$O)$_2$CH$_2$CF$_3$, CF$_3$CH$_2$OCH$_2$CH(CH$_3$)OCH$_2$CF$_3$, and any combination thereof.

16. The electrolyte according to claim 1, further comprising a cyclic phosphonic anhydride; based on the total weight of the electrolyte, a content of cyclic phosphonic anhydride is about 0.01-10 wt %.

17. The electrolyte according to claim 1, further comprising a cyclic carboxylate ester, including γ-butyrolactone or γ-valerolactone or a combination thereof.

18. An electrochemical device, wherein the electrochemical device comprises electrodes and an electrolyte comprising a dinitrile compound, a trinitrile compound, and propyl propionate; wherein, based on the total weight of the electrolyte, the weight percentage of the dinitrile compound is X, and the weight percentage of the trinitrile compound is Y and a weight percentage of the propyl propionate is Z; wherein, $$\text{about } 2.2\ wt\% \leq (X + Y) \leq \text{about } 8\ wt\%,$$

$$\text{about } 0.1 \leq (X/Y) \leq \text{about } 6,$$

$$\text{about } 1\ wt\% < Y < \text{about } 5\ wt\%,$$

$$\text{about } 30\ wt\% \leq Z \leq \text{about } 50\ wt\%, \text{ and}$$

$$\text{about } 0.02 < (Y/Z) \leq \text{about } 0.3;$$

wherein the dinitrile compound is one selected from the group consisting of glutaronitrile, adiponitrile, 1,5-dicyanopentane, 1,6-dicyanohexane, 1,7-dicyanoheptane, 1,8-dicyanooctane, 1,9-dicyanononane, 1,10-dicyanodecane, 1,12-dicyanododecane, tetramethylbutanedinitrile, 2-methylglutaronitrile, 2,4-dimethylglutaronitrile, 2,2,4,4-tetramethylglutaronitrile, 1,4-dicyanopentane, 2,6-dicyanoheptane, 2,7-dicyanooctane, 2,8-dicyanononane, 1,6-dicyanodecane, 1,2-dicyanobenzene, 1,3-dicyanobenzene, 1,4-dicyanobenzene, 3,5-dioxa-pimelonitrile, 1,4-bis(cyanoethoxy)butane, ethylene glycol bis(2-cyanoethyl)ether, diethylene glycol bis(2-cyanoethyl)ether, triethylene glycol bis(2-cyanoethyl)ether, tetraethylene glycol bis(2-cyanoethyl)ether, 3,6,9,12,15,18-hexaoxaeicosanoic dinitrile, 1,3-bis(2-cyanoethoxy)propane, 1,4-bis(2-cyanoethoxy)butane, 1,5-bis(2-cyanoethoxy)pentane, ethylene glycol bis(4-cyanobutyl)ether, 1,4-dicyano-2-butene, 1,4-dicyano-2-methyl-2-butene, 1,4-dicyano-2-ethyl-2-butene, 1,4-dicyano-2,3-dimethyl-2-butene, 1,4-dicyano-2,3-diethyl-2-butene, 1,6-dicyano-3-hexene, 1,6-dicyano-2-methyl-3-hexene, 1,6-dicyano-2-methyl-5-methyl-3-hexene, and any combination thereof;
wherein the trinitrile compound is one selected from the group consisting of: 1,3,5-pentanetricarbonitrile; 1,2,3-propanetrinitrile; 1,3,6-hexanetricarbonitrile; 1,2,6-hexanetricarbonitrile; 1,2,3-tris(2-cyanoethoxy)propane; 1,2,4-tris(2-cyanoethoxy)butane; 1,1,1-tris (cyanoethoxymethylene)ethane; 1,1,1-tris(cyanoethoxymethylene)propane; 3-methyl-1,3,5-tris(cyanoethoxy)pentane; 1,2,7-tris(cyanoethoxy) heptane; 1,2,6-tris(cyanoethoxy)hexane; 1,2,5-tris(cyanoethoxy)pentane; and any combination thereof.

19. The electrochemical device according to claim 18, wherein the electrode comprises a cathode,
the cathode comprises a current collector, a single-sided coating and a double-sided coating;
a first part of the current collector is provided with the single-sided coating and a second part of the current collector is provided with the double-sided coating;
an electrode compaction density of the single-sided coating is D1, and, an electrode compaction density of the double-sided coating is D2, wherein, about 0.8≤(D1/D2)≤about 1.2; and, $$\text{about } 3.5\ g/cm^3 \leq D2 \leq \text{about } 4.3\ g/cm^3.$$

20. The electrochemical device according to claim 19, wherein,
both the single-sided coating and the double-sided coating are present on the same electrode; or,
only a single-sided coating or a double-sided coating present on the same electrode.

21. The electrochemical device according to claim 19, wherein the electrode comprises an anode,
the anode comprises a current collector, a single-sided coating and a double-sided coating;
a first part of the current collector is provided with the single-sided coating and a second part of the current collector is provided with the double-sided coating;
an electrode compaction density of the single-sided coating is D1, and,
an electrode compaction density of the double-sided coating is D2, wherein, about 0.8≤(D1/D2)≤about 1.2; and, $$\text{about } 1.2\ g/cm^3 \leq D2 \leq \text{about } 1.8\ g/cm^3.$$

22. The electrochemical device according to claim 18, wherein the dinitrile compound comprises ethylene glycol bis(2-cyanoethyl) ether, based on the total weight of the electrolyte, a content of ethylene glycol bis(2-cyanoethyl) ether is greater than 0.01 wt %, and less than 0.5 wt %.

23. The electrochemical device according to claim 18, wherein the dinitrile compound comprises ethylene glycol bis(2-cyanoethyl) ether, based on the total weight of the electrolyte, a content of ethylene glycol bis(2-cyanoethyl) ether is M; wherein, $$\text{about } 2M < Y \leq \text{about } 4M.$$

24. The electrochemical device according to claim 18, wherein the dinitrile compound comprises adiponitrile, based on the total weight of the electrolyte, a content of adiponitrile is greater than 2 wt %, and less than 6 wt %.

25. The electrochemical device according to claim 18, wherein the electrochemical device satisfies at least one of the following conditions:
(1) the electrolyte further comprises a compound having a sulfur-oxygen double bond, wherein the compound having a sulfur-oxygen double bond comprises 1,3-propanesultone, based on the total weight of the electrolyte, a content of 1,3-propanesultone is greater than 0.1 wt %, and less than 3 wt %;

(2) the electrolyte further comprises fluorinated cyclic carbonate ester, wherein the fluorinated cyclic carbonate ester comprises fluoroethylene carbonate, based on the total weight of the electrolyte, a content of fluoroethylene carbonate is greater than 0.1 wt %, and less than 4 wt %;

(3) the electrolyte further comprises a compound having a sulfur-oxygen double bond, wherein the compound having a sulfur-oxygen double bond comprises ethylene sulfate, based on the total weight of the electrolyte, a content of ethylene sulfate is greater than 0.5 wt %, and less than 2 wt %; or (4) the electrolyte further comprises a compound having a sulfur-oxygen double bond, wherein the compound having a sulfur-oxygen double bond comprises ethylene sulfate, based on the total weight of the electrolyte, a content of ethylene sulfate is greater than 0.01 wt %, and less than 0.5 wt %.

26. The electrochemical device according to claim 18, wherein about 40 wt %≤Z≤about 50 wt % or about 1.5<(X/Y)≤about 2.3.

27. The electrochemical device according to claim 18, wherein about 30 wt %≤Z≤about 45 wt % or about 2.5<(X/Y)≤about 6.

28. The electrochemical device according to claim 18, wherein about 3.5 wt %<(X+Y)<about 8 wt %, and about 0.1≤(X/Y)≤about 2.3.

29. The electrochemical device according to claim 18, wherein about 3.5 wt %<(X+Y)<about 8 wt %, and about 1.5<(X/Y)≤about 2.3.

30. An electronic device, comprising an electrochemical device; the electrochemical device includes electrodes and an electrolyte comprising a dinitrile compound, a trinitrile compound, and propyl propionate; wherein, based on the total weight of the electrolyte, the weight percentage of the dinitrile compound is X, and the weight percentage of the trinitrile compound is Y and a weight percentage of the propyl propionate is Z; wherein, $$\text{about } 2.2 \ wt\% \leq (X + Y) \leq \text{about } 8 \ wt\%,$$

$$\text{about } 0.1 \leq (X/Y) \leq \text{about } 6,$$

$$\text{about } 1 \ wt\% < Y < \text{about } 5 \ wt\%,$$

$$\text{about } 30 \ wt\% \leq Z \leq \text{about } 50 \ wt\%, \text{ and}$$

$$\text{about } 0.02 < (Y/Z) \leq \text{about } 0.3;$$

wherein the dinitrile compound is one selected from the group consisting of glutaronitrile, adiponitrile, 1,5-dicyanopentane, 1,6-dicyanohexane, 1,7-dicyanoheptane, 1,8-dicyanooctane, 1,9-dicyanononane, 1,10-dicyanodecane, 1,12-dicyanododecane, tetramethylbutanedinitrile, 2-methylglutaronitrile, 2,4-dimethylglutaronitrile, 2,2,4,4-tetramethylglutaronitrile, 1,4-dicyanopentane, 2,6-dicyanoheptane, 2,7-dicyanooctane, 2,8-dicyanononane, 1,6-dicyanodecane, 1,2-dicyanobenzene, 1,3-dicyanobenzene, 1,4-dicyanobenzene, 3,5-dioxa-pimelonitrile, 1,4-bis(cyanoethoxy)butane, ethylene glycol bis(2-cyanoethyl)ether, diethylene glycol bis(2-cyanoethyl)ether, triethylene glycol bis(2-cyanoethyl)ether, tetraethylene glycol bis(2-cyanoethyl)ether, 3,6,9,12,15,18-hexaoxaeicosanoic dinitrile, 1,3-bis(2-cyanoethoxy)propane, 1,4-bis(2-cyanoethoxy)butane, 1,5-bis(2-cyanoethoxy)pentane, ethylene glycol bis(4-cyanobutyl)ether, 1,4-dicyano-2-butene, 1,4-dicyano-2-methyl-2-butene, 1,4-dicyano-2-ethyl-2-butene, 1,4-dicyano-2,3-dimethyl-2-butene, 1,4-dicyano-2,3-diethyl-2-butene, 1,6-dicyano-3-hexene, 1,6-dicyano-2-methyl-3-hexene, 1,6-dicyano-2-methyl-5-methyl-3-hexene, and any combination thereof;

wherein the trinitrile compound is one selected from the group consisting of: 1,3,5-pentanetricarbonitrile; 1,2,3-propanetrinitrile; 1,3,6-hexanetricarbonitrile; 1,2,6-hexanetricarbonitrile; 1,2,3-tris(2-cyanoethoxy)propane; 1,2,4-tris(2-cyanoethoxy)butane; 1,1,1-tris(cyanoethoxymethylene)ethane; 1,1,1-tris(cyanoethoxymethylene)propane; 3-methyl-1,3,5-tris(cyanoethoxy)pentane; 1,2,7-tris(cyanoethoxy)heptane; 1,2,6-tris(cyanoethoxy)hexane; 1,2,5-tris(cyanoethoxy)pentane; and any combination thereof.

* * * * *